(12) United States Patent
Park et al.

(10) Patent No.: US 11,616,549 B2
(45) Date of Patent: Mar. 28, 2023

(54) METHOD FOR REPORTING CHANNEL STATE INFORMATION IN WIRELESS COMMUNICATION SYSTEM AND APPARATUS THEREFOR

(71) Applicant: LG Electronics Inc., Seoul (KR)

(72) Inventors: Haewook Park, Seoul (KR); Kijun Kim, Seoul (KR); Jiwon Kang, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 17/008,019

(22) Filed: Aug. 31, 2020

(65) Prior Publication Data
US 2020/0403679 A1  Dec. 24, 2020

Related U.S. Application Data

(63) Continuation of application No. 16/126,390, filed on Sep. 10, 2018, now Pat. No. 10,812,164.
(Continued)

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0486* (2013.01); *H04L 5/0048* (2013.01);
(Continued)

(58) Field of Classification Search
CPC .... H04B 7/0626; H04B 7/0486; H04B 7/065; H04B 7/063; H04B 7/0632; H04B 7/0639;
(Continued)

(56) References Cited

U.S. PATENT DOCUMENTS 9,680,538 B2   6/2017  Xia et al.
9,825,742 B2  11/2017  Nam et al.
(Continued)

FOREIGN PATENT DOCUMENTS

CN   102130708       7/2011
EP   2744286 A1 *  6/2014  ............. H04B 7/024
(Continued)

OTHER PUBLICATIONS

Samsung, Remaining details of Type I and Type II CSI documents, 3GPP TSG RAN WG1 Meeting #90, Aug. 21-25, 2017 (Year: 2017).*
(Continued)

*Primary Examiner* — Linda Wong
(74) *Attorney, Agent, or Firm* — Fish & Richardson P.C.

(57) ABSTRACT

Provided are a method and an apparatus for reporting channel state information (CSI) by a user equipment in a wireless communication system. According to the present invention, the user equipment may receive configuration information related with the CSI from a base station and measure the CSI based on the configuration information. Thereafter, the user equipment includes reporting the CSI to the base station and the CSI includes a rank indicator (RI), a channel quality indicator (CQI), and an indicator indicating the number of amplitude coefficients other than 0 and the second part includes a precoding matrix indicator (PMI).

14 Claims, 13 Drawing Sheets

Related U.S. Application Data

(60) Provisional application No. 62/565,165, filed on Sep. 29, 2017, provisional application No. 62/559,671, filed on Sep. 18, 2017, provisional application No. 62/557,055, filed on Sep. 11, 2017, provisional application No. 62/556,280, filed on Sep. 8, 2017.

(51) Int. Cl.
  *H04W 72/10* (2009.01)
  *H04W 72/04* (2009.01)
  *H04L 5/00* (2006.01)

(52) U.S. Cl.
  CPC ....... *H04W 72/0413* (2013.01); *H04W 72/10* (2013.01); *H04B 7/065* (2013.01); *H04L 5/0051* (2013.01)

(58) Field of Classification Search
  CPC ... H04L 5/0048; H04L 5/0051; H04L 1/0026; H04L 1/0042; H04L 1/0067; H04L 5/005; H04W 72/0413; H04W 72/10
  See application file for complete search history.

(56) References Cited

U.S. PATENT DOCUMENTS

| | | | | |
|---|---|---|---|---|
| 11,245,450 | B2* | 2/2022 | Na | H04B 7/0626 |
| 2007/0280116 | A1* | 12/2007 | Wang | H04B 7/0626 370/329 |
| 2016/0373178 | A1 | 12/2016 | Nam et al. | |
| 2018/0006700 | A1 | 1/2018 | Frenne et al. | |
| 2018/0026770 | A1 | 1/2018 | Li et al. | |
| 2019/0089436 | A1 | 3/2019 | Wei et al. | |
| 2019/0190655 | A1 | 6/2019 | Pan et al. | |

FOREIGN PATENT DOCUMENTS

| | | | | |
|---|---|---|---|---|
| JP | 2020502922 | | 1/2020 | |
| WO | WO-2013055152 | A1* | 4/2013 | H04B 17/24 |
| WO | WO2016122109 | | 8/2016 | |
| WO | WO2016163843 | | 10/2016 | |
| WO | WO2017034270 | | 3/2017 | |
| WO | WO2017049599 | | 3/2017 | |
| WO | WO-2017146533 | A1* | 8/2017 | H04B 7/0417 |

OTHER PUBLICATIONS

3rd Generation Partnership Project; Technical Specification Group Radio Access Network; "NR; Physical layer procedures for data (Release 15)," 3GPP TS 38.214 V0.1.2, dated Sep. 2017, 33 pages.

Donthi et al, "Performance Analysis of Subband-Level Channel Quality Indicator Feedback Scheme of LTE," 2010 National Conference on Communications (NCC), Jan. 29-31, 2010, pp. 1-5 (Year: 2010).

Ericsson, "Encoding and mapping of CSI parameters," R1-1714285, 3GPP TSG-RAN WG1 #90, Prague, Czech Republic, Aug. 21-25, 2017, 7 pages.

Extended European Search Report in European Application No. 18833147.4, dated Feb. 5, 2020, 12 pages.

Huawei, HiSilicon, "CSI feedback for Type II codebook," R1-1713764, 3GPP TSG RAN WG1 Meeting #90, Prague, Czech Republic, Aug. 21-25, 2017, 4 pages.

Intel Corporation, "On Type I and Type II CSI reporting," R1-1712547, 3GPP TSG RAN WG1 #90, Prague, Czech Republic, dated Aug. 21-25, 2017, 5 pages.

LG Electronics, "Discussions on CSI reporting," R1-1715858, 3GPP TSG RAN WG1 Meeting NR#3, Nagoya, Japan, dated Sep. 18-21, 2017, 11 pages.

Miao et al, Amplitude Quantization for Type-2 Codebook Based CSI feedback in New Radio Systems, 2018 European Conference on Networks and Communications (EuCNC), Jun. 18-21, 2018, pp. 1-5 (Year: 2018_.

NTT DOCOMO, "Feedback Design for CSI Type II," R1-1713916, 3GPP TSG RAN WG1 Meeting #90, Prague, Czechia, Aug. 21-25, 2017, 7 pages.

Qualcomm Incorporated, "On Type I and Type II CSI parameters encoding," R1-1713397, 3GPP TSG RAN WG1 #90, Prague, Czech, Aug. 21-25, 2017, 5 pages.

Samsung et al., "WF on CSI Format Design," R1-1715288, 3GPP TSG RAN WG1 Meeting #90, Prague, P.R. Czechia, dated Aug. 21-25, 2017, 5 pages.

Samsung, "Remaining details of Type I and Type II CSI & nbsp; codebooks," R1-1713590, 3GPP TSG RAN WG1 Meeting #90, Prague, P.R. Czechia, Aug. 21-25, 2017, 12 pages (year:2017_.

ZTE, "On CSI framework and beam management framework," R1-1712292, 3GPP TSG RAN WG1 #90, Aug. 12, 2017, 12 pages.

CATT, "Discussion on CSI feedback mechanism," R1-1712374, 3GPP TSG RAN WG1 Meeting #90, Prague, Czechia, Aug. 21-25, 2017, 7 pages.

Huawei, HiSilicon, "CSI feedback for Type 1 codebook," R1-1713763, 3GPP TSG RAN WG1 Meeting #90, Prague, Czech Republic, Aug. 21-25, 2017, 8 pages.

3rd Generation Partnership Project; Technical Specification Group Radio Access Network, "NR; Physical layer procedures for data (Release 15)," 3GPP TS 38.214, V0.1.1, dated Aug. 2017, 33 pages.

Nokia, Alcatel-Lucent Shanghai Bell, "On CSI-RS Design for DL Beam Management," R1-1703179, 3GPP TSG RAN WG1 #88, Athens, Greece, dated Feb. 13-17, 2017, 14 pages.

Office Action in Chinese Appln. No. 201880003111.4, dated Aug. 11, 2021, 12 pages (with English translation).

* cited by examiner

M NUMBER OF ANTENNA ELEMENTS

M NUMBER OF ANTENNA ELEMENTS

METHOD FOR REPORTING CHANNEL STATE INFORMATION IN WIRELESS COMMUNICATION SYSTEM AND APPARATUS THEREFOR

CROSS-REFERENCE TO RELATED APPLICATIONS

This application is a continuation of U.S. application Ser. No. 16/126,390, filed on Sep. 10, 2018, which claims priority to Provisional Application No. 62/556,280, filed on Sep. 8, 2017, Provision Application No. 62/557,055, filed on Sep. 11, 2017, Provisional Application No. 62/559,671, filed on Sep. 18, 2017, and Provisional Application No. 62/565,165, filed on Sep. 29, 2017, the entire contents of which are hereby incorporated by reference in their entirety.

BACKGROUND OF THE INVENTION

Field of the Invention

The present invention relates to a wireless communication system, and more particularly, to a method for transmitting and receiving channel state information in a wireless communication system and an apparatus therefor.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

The present invention provides a method and an apparatus of encoding and mapping for transmitting and receiving a channel state information (CSI)-reference signal (RS) in a wireless communication system.

The present invention also provides a scheme that configures feedback contents when feeding back CSI according to a configuration scheme of a codebook in a wireless communication system.

The present invention also provides a method for deciding transmission power for transmitting CSI according to a configuration scheme of the CSI.

The present invention also provides a method for mapping CSI based on a symbol to which a demodulation reference signal (DMRS) for demodulating data is mapped according to a priority of the CSI.

The technical objects of the present invention are not limited to the aforementioned technical objects, and other technical objects, which are not mentioned above, will be apparently appreciated by a person having ordinary skill in the art from the following description.

In an aspect, provided is a method for reporting, by a user equipment, channel state information (CSI) in a wireless communication system. The method includes: receiving configuration information related with the CSI from a base station; measuring the CSI based on the configuration information; and reporting the CSI to the base station, and the CSI is comprises a first part and a second part, the first part includes a rank indicator (RI), a channel quality indicator (CQI), and an indicator indicating the number of amplitude coefficients other than 0, and the second part includes a precoding matrix indicator (PMI).

Further, in the present invention, a payload size of the second part may be determined by the first part.

In addition, in the present invention, a bitwidth of the PMI may be determined based on the rank indicator and the indicator.

Moreover, in the present invention, the CSI may be transmitted on a physical uplink shared channel (PUSCH), and transmission power of the CSI may increase as the number of bits of the first part increases.

Moreover, in the present invention, in the present invention, the CSI may be transmitted on a physical uplink shared channel (PUSCH), and transmission power of the CSI may increase as the number of bits of the first part increases.

In addition, in the present invention, the rank indicator, the channel quality indicator, and the indicator may be each encoded through a same coding rate with separate field in the first part, respectively.

In addition, in the present invention, the indicator may be independently indicated for each layer.

Further, in the present invention, the number of bits of the indicator may be configured for each layer by the following equation when L which is a codebook configuration parameter indicated by higher layer signaling indicates the number of base vectors linearly coupled in a linear coupling based codebook.

$$\lceil \log_2(2L-1) \rceil$$

Further, in the present invention, the first part may have a higher CSI priority than the second part, and the first part and the second part may mapped to a symbol next a symbol to which a demodulation reference signal (DMRS) is mapped according to the CSI priority.

In addition, in the present invention, the first part and the second part may be sequentially mapped in a direction in which an index of the symbol to which the DMRS is mapped increases.

Further, the number of symbols to which the first part is mapped may be determined based on the number of bits of the first part and the number of bits of the second part.

Moreover, in the present invention, the first part and the second parts may be encoded according to different modulation orders and/or coding rates, respectively.

Further, in the present invention, the first part and the second part may be transmitted through different transmission powers and specific values of the first part and/or the second part may be repeatedly transmitted.

In addition, in another aspect, provided is a user equipment for reporting channel state information (CSI) in a wireless communication system. The user equipment includes: a radio frequency (RF) module transmitting and receiving a radio signal; and a processor controlling the RF module, and the processor receives configuration information related with the CSI from a base station, measures the CSI based on the configuration information, and reports the CSI to the base station, the CSI is comprises a first part and a second part, the first part includes a rank indicator (RI), a channel quality indicator (CQI), and an indicator indicating the number of amplitude coefficients other than 0, and the second part includes a precoding matrix indicator (PMI).

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

DESCRIPTION OF EXEMPLARY EMBODIMENTS

Figure 1:
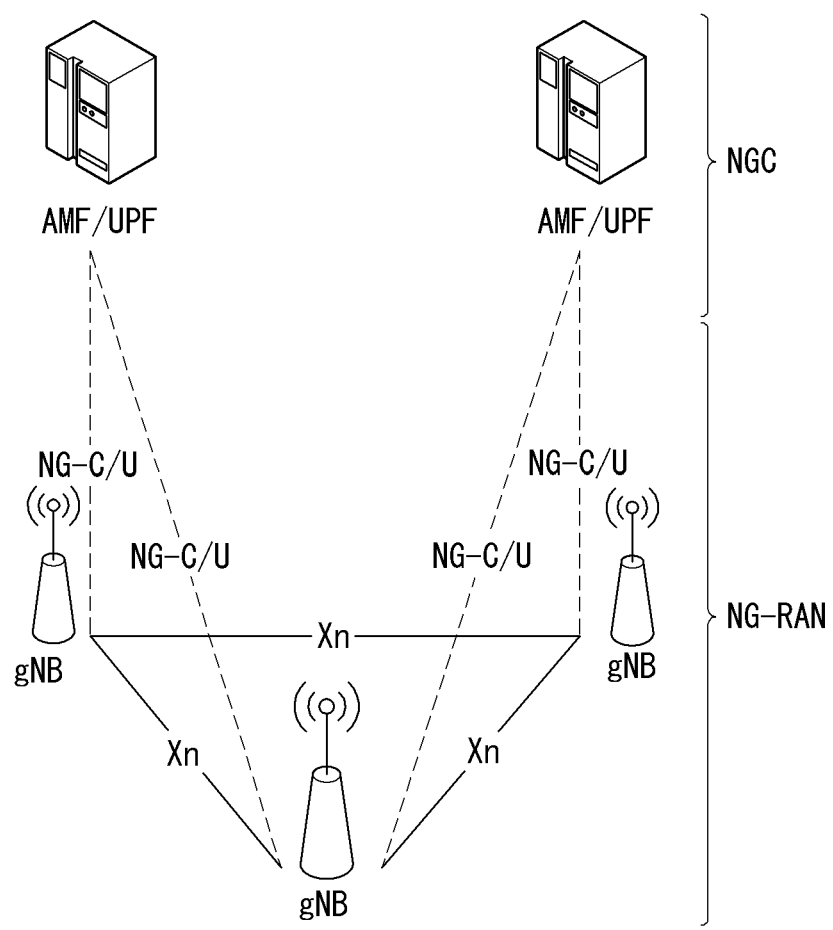
FIG. 1 is a diagram illustrating an example of an overall system structure of NR to which a method proposed in the present specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} \cdot N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
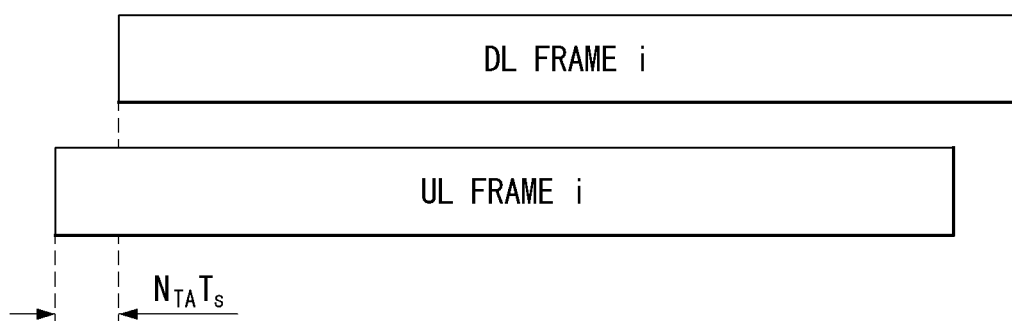
FIG. 2 illustrates a relationship between an uplink frame and a downlink frame in a wireless communication system to which the method proposed in the present specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |

TABLE 3-continued

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
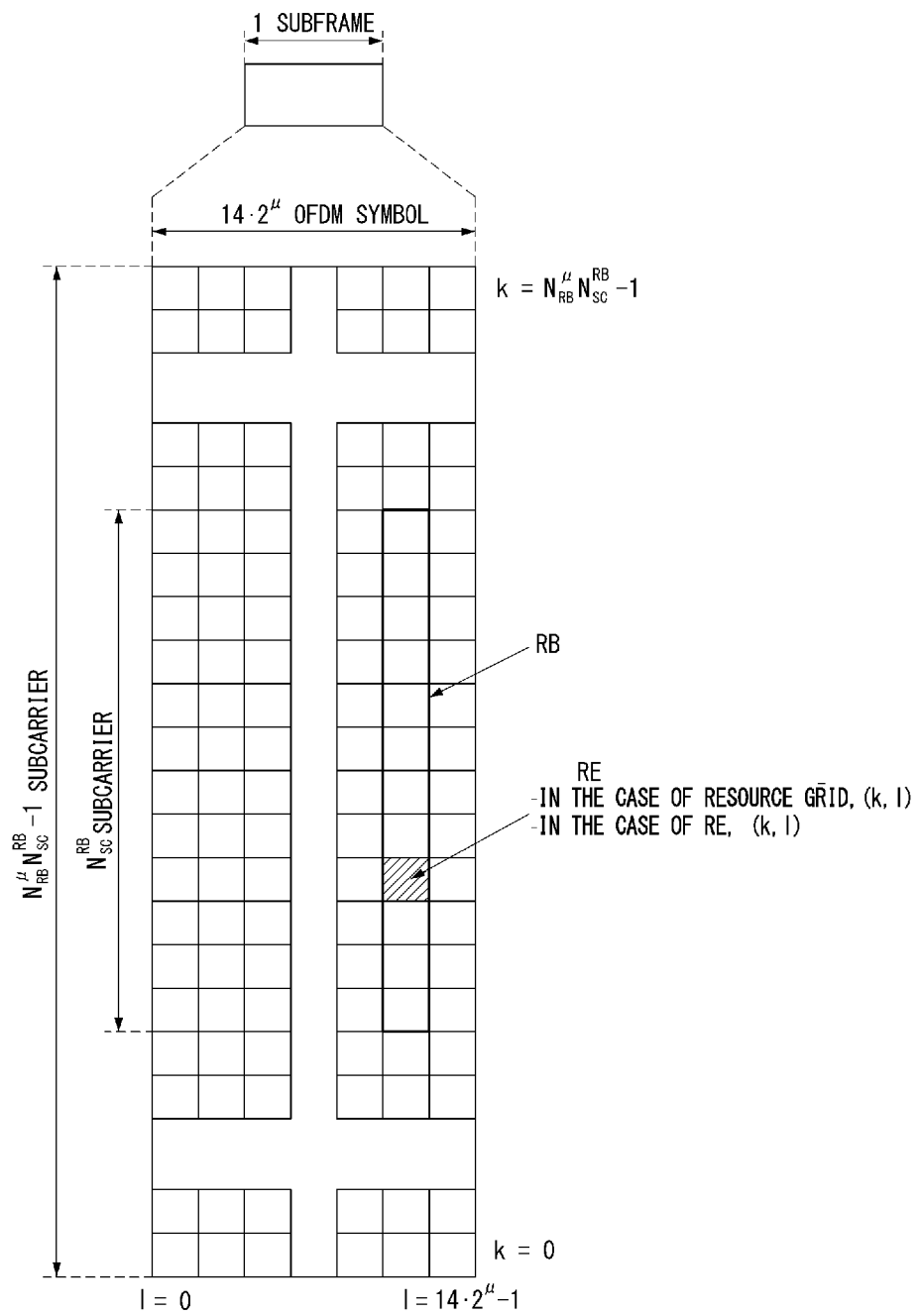
FIG. 3 illustrates an example of a resource grid supported in the wireless communication system to which the method proposed in the present specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l). Herein, $k=0, \ldots, N_{RB}^{\mu} N_{sc}^{RB}-1$ is an index in the frequency domain, and $\bar{l}=0, \ldots, 2\mu N_{symb}^{(\mu)}-1$ indicates a location of a symbol in a subframe. To indicate a resource element in a slot, the index pair (k,$\bar{l}$) is used. Herein, $l=0, \ldots, N_{symb}^{\mu}-1$.

The resource element (k,$\bar{l}$) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
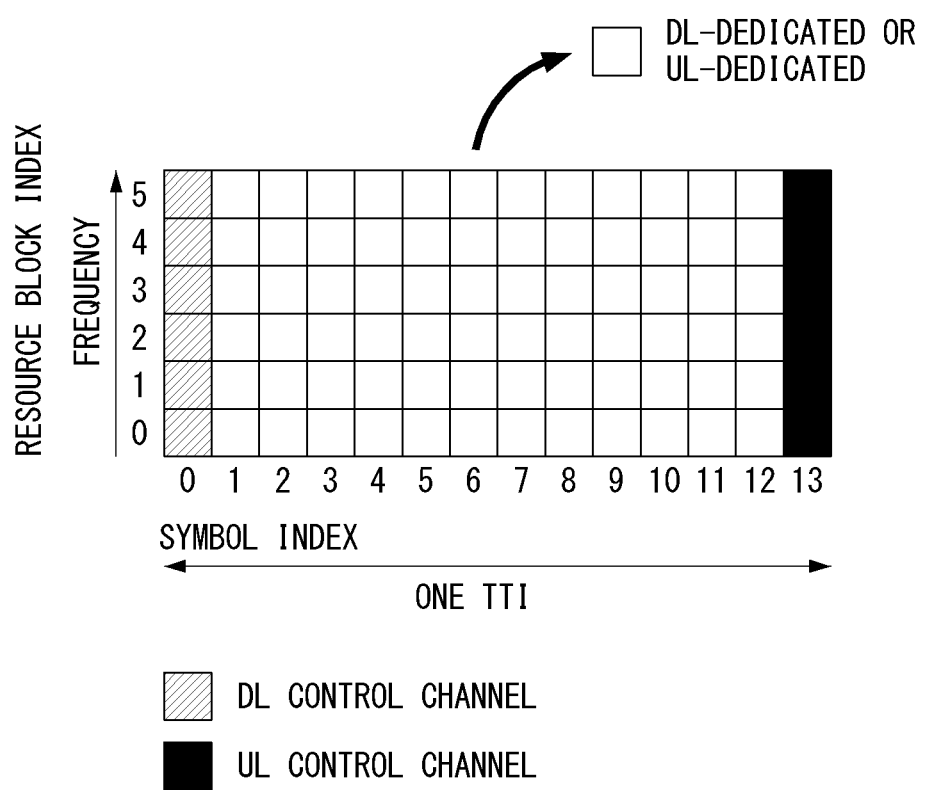
FIG. 4 is a diagram illustrating a self-contained subframe structure in the wireless communication system to which the method proposed in the present specification may be applied.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

Figure 5A:
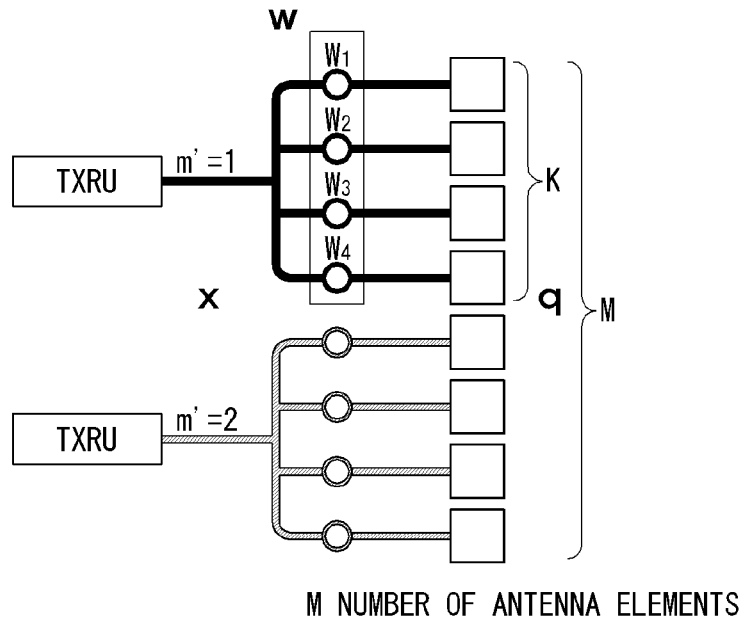
FIGS. 5A and 5B illustrate a transceiver unit model in the wireless communication system to which the method proposed in the present specification may be applied.
Figure 5B:
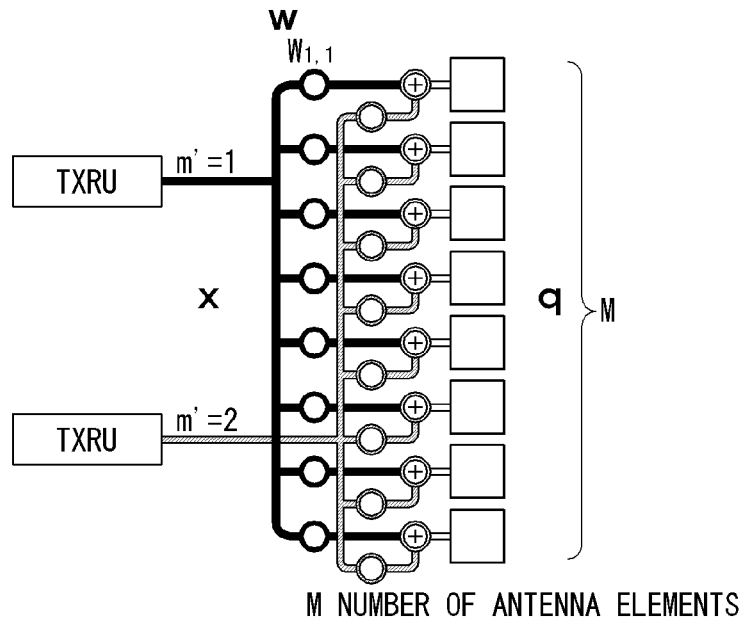

FIGS. 5A and 5B illustrate an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5A, or as a TXRU virtualization model option-2: full-connection model.

Referring to FIG. 5A, in the sub-array partition model, the antenna elements are divided into multiple antenna element groups, and each TXRU may be connected to one of the multiple antenna element groups. In this case, the antenna elements are connected to only one TXRU.

Referring to FIG. 5B, in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIGS. 5A and 5B, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping in FIGS. 5A and 5B is merely an example, and the present disclosure is not limited thereto and may be equivalently applied even to mapping of TXRUs and antenna elements which can be implemented in a variety of hardware forms.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 6:
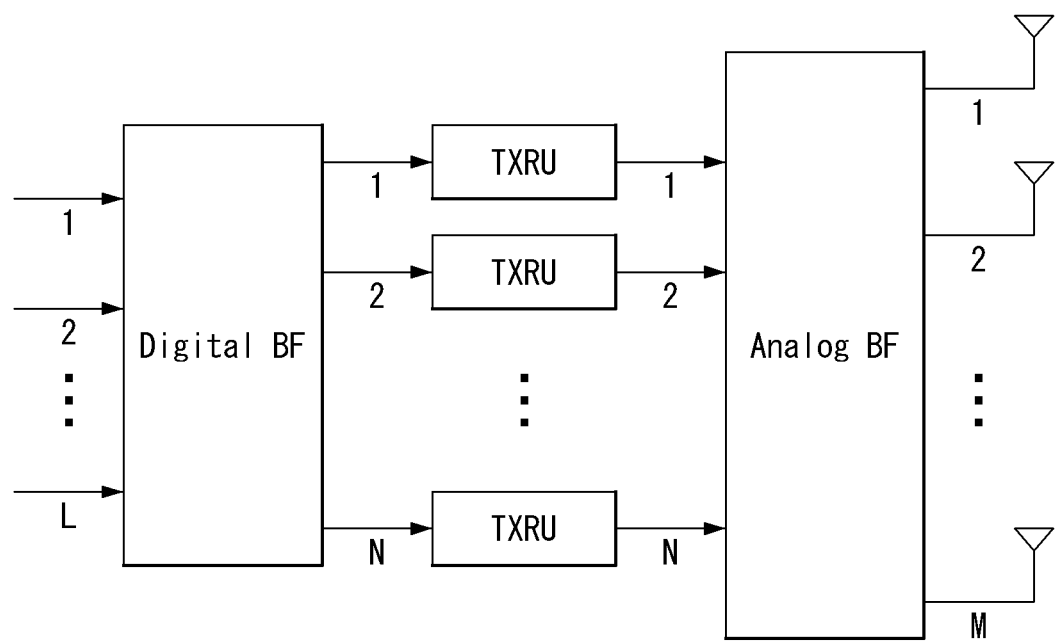
FIG. 6 is a diagram illustrating a hybrid beamforming structure in terms of TXRU and a physical antenna in the wireless communication system to which the method proposed in the present specification may be applied.

FIG. 6 is a diagram illustrating a hybrid beamforming structure in terms of TXRU and a physical antenna in the wireless communication system to which the method proposed in the present specification may be applied.

In FIG. 6, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 6, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTELTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

Figure 7:
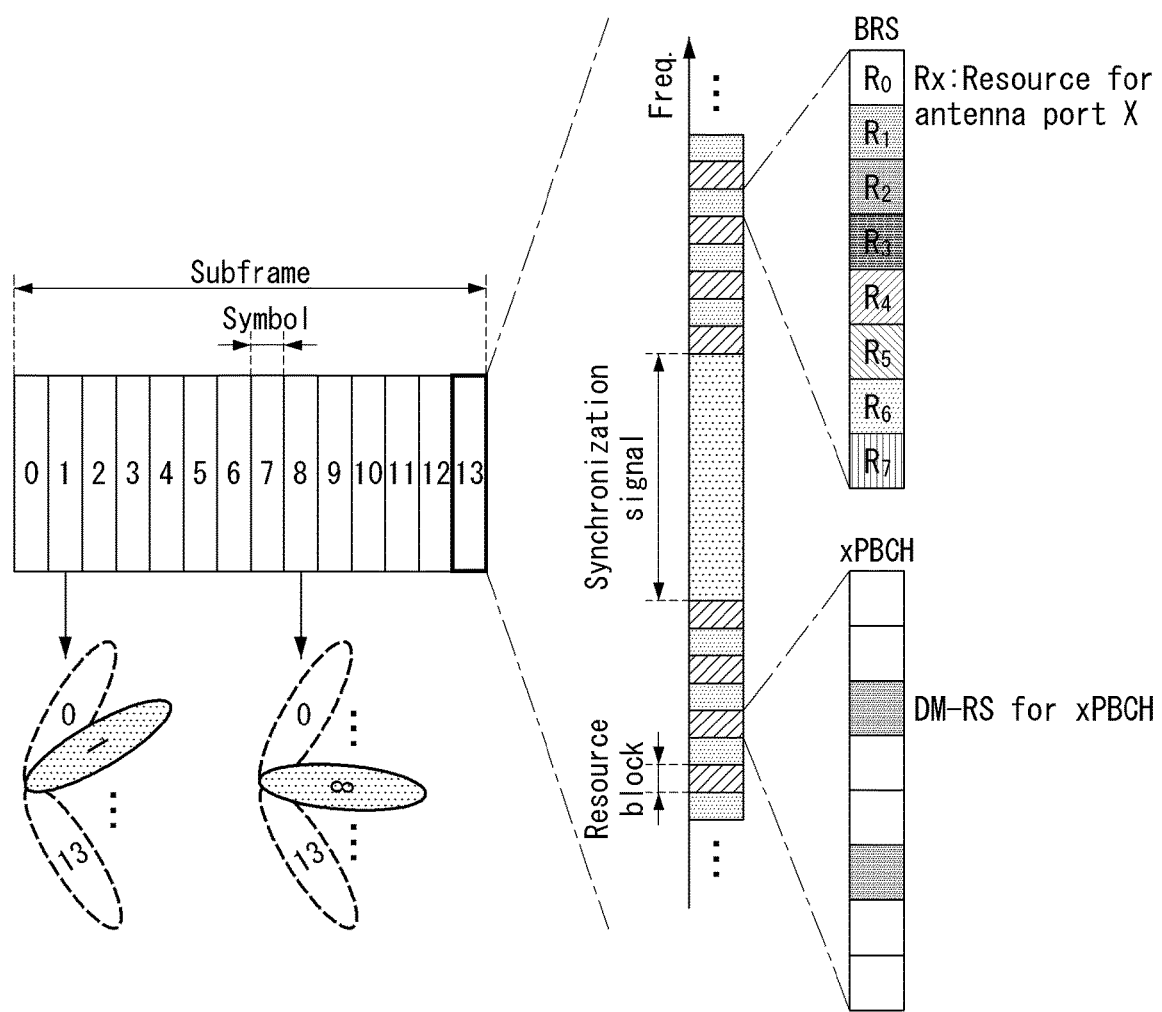
FIG. 7 is a diagram illustrating an example of a beam sweeping operation to which the method proposed in the present specification may be applied.

FIG. 7 is a diagram illustrating an example of a beam sweeping operation to which the method proposed in the present specification may be applied.

As described in FIG. 6, when the BS uses a plurality of analog beams, a beam sweeping operation is considered, which allows all UEs to have a reception opportunity by changing a plurality of analog beams to which the BS intends to apply in a specific subframe according to the symbol at least with respect to a synchronization signal, system information, and a paging signal because an analog beam which is advantageous for signal reception for each UE.

FIG. 7 illustrates an example of a beam sweeping operation for a synchronization signal and system information in a downlink transmission process. In FIG. 7, a physical resource (or physical channel) through which the system information is transmitted in a broadcasting scheme in the New RAT is referred to as physical broadcast channel (xPBCH).

In this case, analog beams belonging to different antenna panels within one symbol may be simultaneously transmitted and discussed is a scheme that introduces a beam reference signal (BRS) which is a reference signal transmitted, to which a single analog beam (corresponding to a specific antenna panel) is applied as illustrated in FIG. 7 to measure channels depending on the analog beam.

The BRS may be defined for a plurality of antenna ports and each antenna port of the BRS may correspond to the single analog beam.

In this case, unlike the BRS, the synchronization signal or xPBCH may be transmitted, to which all of the analog beams in the analog beam group are applied so that the signal may be well received by random UEs.

RRM Measurement

The LTE system supports RRM operations including power control, scheduling, cell search, cell reselection, handover, radio link or connection monitoring, connection establishment/re-establishment, and the like.

In this case, the serving cell may request RRM measurement information, which is a measurement value for performing the RRM operations, to the UE.

For example, the UE may measure information including cell search information for each cell, reference signal received power (RSRP), reference signal received quality (RSRQ), and the like and report the measured information to the BS.

Specifically, in the LTE system, the UE receives 'measConfig' as a higher layer signal for RRM measurement from the serving cell. The UE measures the RSRP or RSRQ according to 'measConfig'.

The RSRP, the RSRQ, and the RSSI are defined as below.

RSRP: The RSRP may be defined as a linear average of a power contribution [W] of a resource element carrying a cell specific reference signal within a considered measurement frequency bandwidth. A cell specific reference signal R0 may be used for deciding the RSRP. When the UE may reliably detect that R1 is available, the UE may decide the RSRP by using R1 in addition to R0.

A reference point of the RSRP may be an antenna connector of the UE.

When receiver diversity is used by the UE, a reported value need not be smaller than the RSRP corresponding to a random individual diversity branch.

RSRQ: The reference signal received quality (RSRQ) is defined as a ratio N×RSRP/(E-UTRA carrier RSSI) and N represents the number of RBs of an E-UTRA carrier RSSI measurement bandwidth. Measurements of numerator and denominator should be performed through the same set of resource blocks.

The E-UTRA carrier received signal strength indicator (RSSI) is received through a block by the UE from all sources including N resource adjacent channel interference, thermal noise, etc., in a linear average of the total received power [W] measured only in an OFDM symbol containing a reference symbol for antenna port 0 and a measurement bandwidth.

When the higher layer signaling represents a specific subframe for performing the RSRQ measurement, the RSSI is measured for all OFDM symbols in the indicated subframe.

The reference point for THE RSRQ should be the antenna connector of the UE.

When the receiver diversity is used by the UE, the reported value should not be smaller than the corresponding RSRQ of the random individual diversity branch.

RSSI: The RSSI means received broadband power including thermal noise and noise generated at the receiver within a bandwidth defined by a receiver pulse shaping filter.

The reference point for measuring the RSSI should be the antenna connector of the UE.

When the receiver diversity is used by the UE, the reported value should not be smaller than the corresponding UTRA carrier RSSI of the random individual receive antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in SIB5 in the case of inter-frequency measurement.

Alternatively, in the absence of such an IE, the measurement may be performed in a frequency band of the entire downlink (DL) system by default. In this case, when the UE receives the allowed measurement bandwidth, the UE may consider the corresponding value as a maximum measurement bandwidth and arbitrarily measure the value of the RSRP within the corresponding value.

However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

Figure 8:
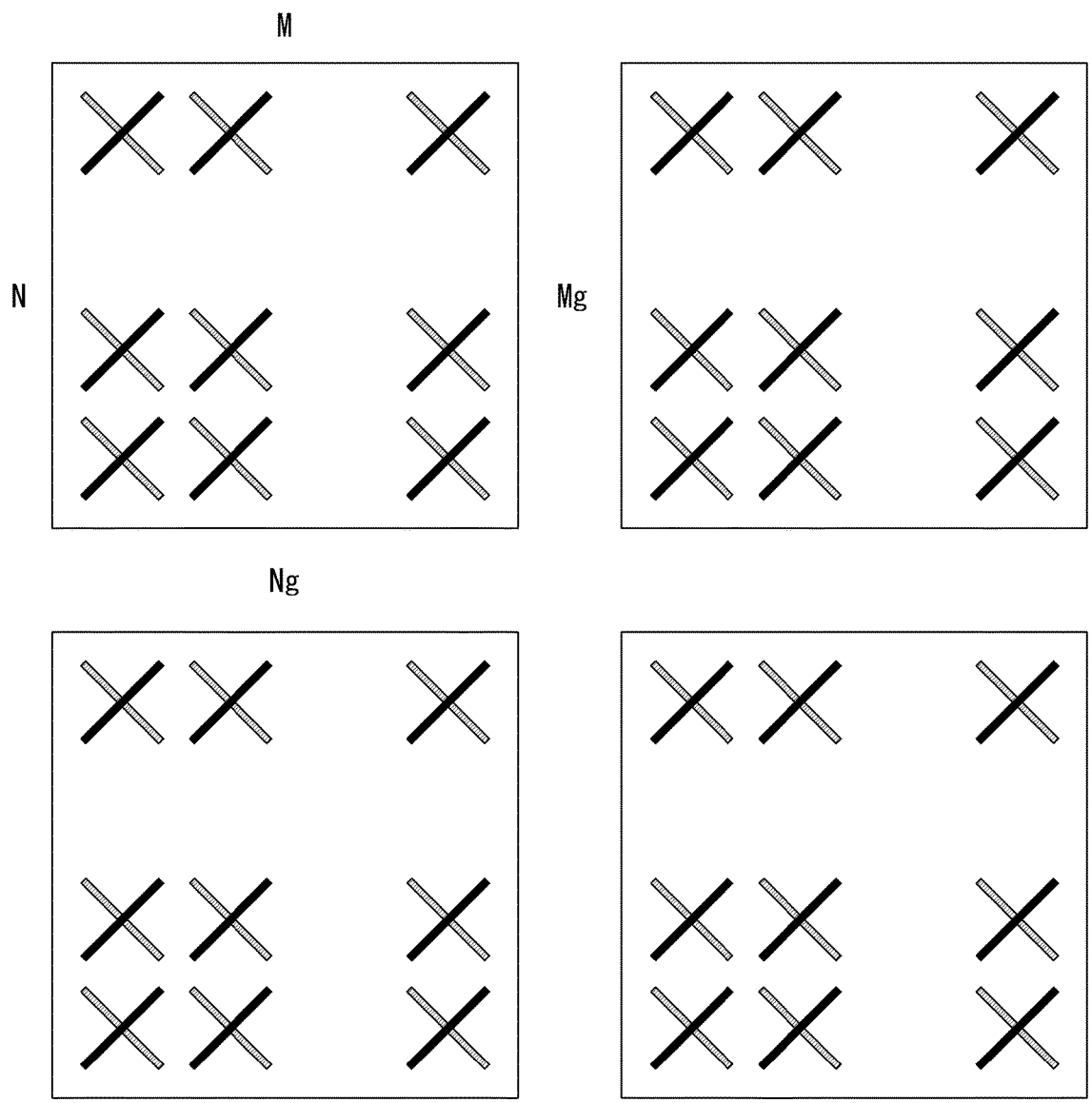
FIG. 8 is a diagram illustrating an example of an antenna array to which the method proposed in the present specification may be applied.

FIG. 8 is a diagram illustrating an example of an antenna array to which the method proposed in the present specification may be applied.

Referring to FIG. 8, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 8. Therefore, the total number of antenna elements may be 2*M*N*Mg*Ng.

Channel State Information (CSI) Related Procedure

Figure 9:
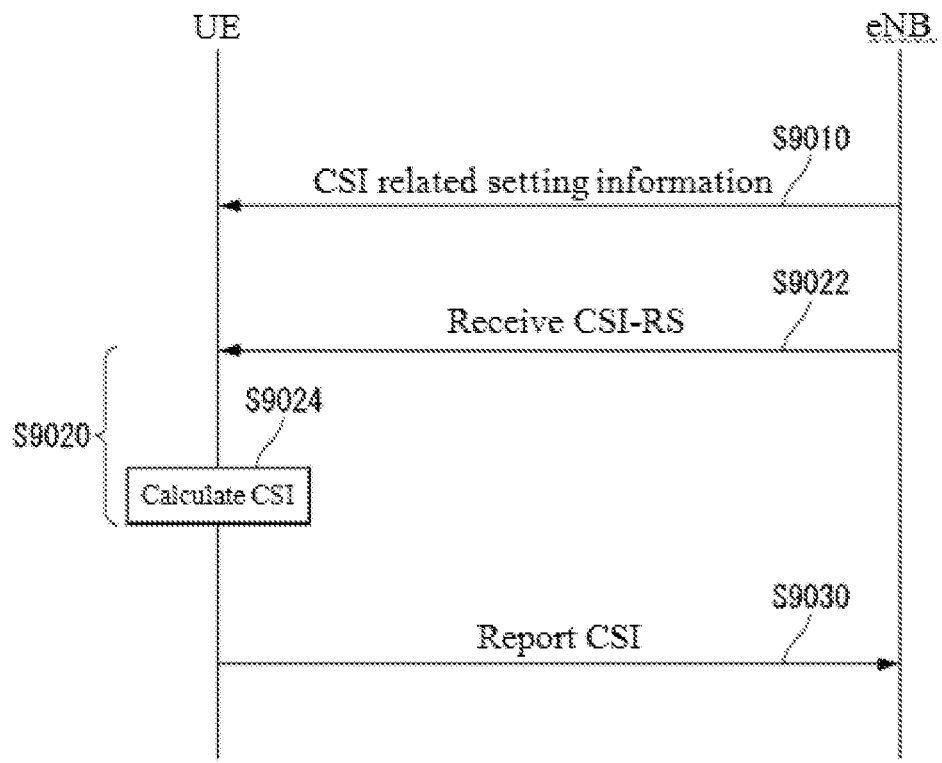
FIG. 9 is a flowchart illustrating an example of a CSI related procedure to which the method proposed in the present specification may be applied.

FIG. 9 is a flowchart illustrating an example of a CSI related procedure to which the method proposed in the present specification may be applied.

In the new radio (NR) system, a channel state information-reference signal (CSI-RS) is used for time/frequency tracking, CSI computation, layer 1 (L1)-reference signal received power (RSRP) computation, or mobility Throughout the present disclosure, "A and/or B" may be interpreted as the same as "including at least one of A or B".

The CSI computation is related to CSI acquisition, and L-RSRP computation is related to beam management (BM).

The CSI indicates all types of information indicative of a quality of a radio channel (or link) formed between a UE and an antenna port.

To perform one of the above purposes of a CSI-RS, a terminal (e.g., a UE) receives CSI related configuration information from a base station (e.g., a general node B (gNB)) through a radio resource control (RRC) signaling (S9010).

The CSI-related configuration information may include at least one of CSI interference management (IM) resource-related information, CSI measurement configuration-related information, CSI resource configuration-related information, CSI-RS resource-related information, or CSI report configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 4, parameters (e.g.: the BM-related parameter repetition, and the tracking-related parameter trs-Info indicative of (or indicating) a purpose of a CSI-RS may be set for each NZP CSI-RS resource set.

Table 4 shows an example of NZP CSI-RS resource set IE.

TABLE 4

```
-- ASN1START
-- TAG-NZP-CSI-RS-RESOURCESET-START
NZP-CSI-RS-ResourceSet : : =       SEQUENCE {
    nzp-CSI-ResourceSetId          NZP-CSI-RS-ResourceSetId,
    nzp-CSI-RS-Resources           SEQUENCE (SIZE (1 . . maxNrofNZP-
CSI-RS-ResourcesPerSet) ) OF NZP-CSI-RS-ResourceId,
    repetition                     ENUMERATED { on,
off }                                  OPTIONAL,
    aperiodicTriggeringOffset      INTEGER(0 . . 4)
                                   OPTIONAL, -- Need S
    trs-Info                       ENUMERATED
{true}                                 OPTIONAL, -- Need R
    . . .
}
    -- TAG-NZP-CSI-RS-RESOURCESET-STOP
    -- ASN1STOP
```

In Table 4, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 4 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L parameter.

The CSI report configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI report configuration-related information may be represented as CSI-ReportConfig IE, and Table 5 shows an example of the CSI-ReportConfig IE.

TABLE 5

```
-- ASN1START
-- TAG-CSI-RESOURCECONFIG-START
CSI-ReportConfig : : =             SEQUENCE {
    reportConfigId                 CSI-ReportConfigId,
    carrier                        ServCellIndex
OPTIONAL, -- Need S
    resourcesForChannelMeasurement CSI-ResourceConfigId,
    csi-IM-ResourcesForInterference CSI-ResourceConfigId
OPTIONAL, -- Need R
    nzp-CSI-RS-ResourcesForInterference CSI-ResourceConfigId
OPTIONAL, -- Need R
    reportConfigType               CHOICE {
        periodic                   SEQUENCE {
            reportSlotConfig           CSI-
ReportPeriodicityAndOffset,
            pucch-CSI-ResourceList     SEQUENCE (SIZE
(1 . . maxNrofBWPs ) ) OF PUCCH-CSI-Resource
        },
        semiPersistentOnPUCCH      SEQUENCE {
            reportSlotConfig           CSI-
ReportPeriodicityAndOffset,
            pucch-CSI-ResourceList     SEQUENCE (SIZE
(1 . . maxNrofBWPs ) ) OF PUCCH-CSI-Resource
        },
        semiPersistentOnPUSCH      SEQUENCE {
            reportSlotConfig           ENUMERATED {s15, s110,
s120, s140, s180, s1160, s1320},
            reportSlotOffsetList       SEQUENCE (SIZE (1 . .
maxNrofUL-Allocations ) ) OF INTEGER(0 . . 32),
            p0alpha                    P0-PUSCH-AlphaSetId
        },
        aperiodic                  SEQUENCE {
            reportSlotOffsetList       SEQUENCE (SIZE
(1 . . maxNrofUL-Allocations ) ) OF INTEGER (0 . . 32 )
        }
    },
    reportQuantity                 CHOICE {
        none                           NULL,
        cri-RI-PMI-CQI                 NULL,
        cri-RI-i1                      NULL,
```

TABLE 5-continued

|  |  |
|---|---|
| cri-RI-i1-CQI | SEQUENCE { |
| pdsch-BundleSizeForCSI | ENUMERATED {n2, n4} OPTIONAL |
| }, | |
| cri-RI-CQI | NULL, |
| cri-RSRP | NULL, |
| ssb-Index-RSRP | NULL, |
| cri-RI-LI-PMI-CQI | NULL |
| }, | |

In addition, the UE measures CSI based on configuration information related to the CSI (S9020).

Measuring the CSI may include (1) receiving a CSI-RS by the UE (S9022) and (2) computing CSI based on the received CSI-RS (S9024).

A sequence for the CSI-RS is generated by Equation 2, and an initialization value of a pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1))$$ [Equation 2]

$$c_{init} = (2^{10}(N_{symb}^{slot}n_{s,f}^{\mu} + l + 1)(2n_{ID} + 1) + n_{ID})\bmod 2^{31}$$ [Equation 3]

In Equations 2 and 3, $n_{s,f}^{\mu}$ is a slot number within a radio frame, and a pseudo-random sequence generator is initialized with Cint at the start of each OFDM symbol where $n_{s,f}^{\mu}$ is the slot number within a radio frame.

In addition, l indicates an OFDM symbol number in a slot, and $n_{ID}$ indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 6 shows an example of CSI-RS-ResourceMapping IE.

In Table 6, a density (D) indicates a density of CSI-RS resources measured in a RE/port/physical resource block (PRB), and nrofPorts indicates the number of antenna ports.

In addition, the UE reports the measured CSI to the base station (S630).

Herein, when a quantity of CSI-ReportConfig in Table 6 is set to "none(or No report)", the UE may skip the reporting.

However, even when the quantity is set to "none(or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

To put it briefly, when repetition is set to "ON" and "OFF", a CSI report may indicate any one of "No report", "SSB Resource Indicator (SSBRI) and L-RSRP", and "CSI-RS Resource Indicator (CRI) and L1-RSRP".

Alternatively, it may be defined to transmit a CSI report indicative of "SSBRI and L1-RSRP" or "CRI and L1-RSRP" when repetition is set to "OFF", it may be defined such that, and to transmit a CSI report indicative of "No report", "SSBRI and L1-RSRP", or "CRI and L1-RSRP" when repetition is "ON".

Hereinafter, a feedback content for CSI reporting will be described.

TABLE 6

| | |
|---|---|
| -- ASN1START | |
| -- TAG-CSI-RS-RESOURCEMAPPING-START | |
| CSI-RS-ResourceMapping ::= | SEQUENCE { |
|   frequencyDomainAllocation | CHOICE { |
|     row1 | BIT STRING (SIZE (4) ), |
|     row2 | BIT STRING (SIZE (12) ), |
|     row4 | BIT STRING (SIZE (3) ), |
|     other | BIT STRING (SIZE (6) ) |
|   }, | |
|   nrofPorts | ENUMERATED {p1,p2,p4,p8,p12,p16,p24,p32}, |
|   firstOFDMSymbolInTimeDomain | INTEGER (0 .. 13), |
|   firstOFDMSymbolInTimeDomain2 | INTEGER (2 .. 12) OPTIONAL, -- Need R |
|   cdm-Type | ENUMERATED {noCDM, fd-CDM2, cdm4-FD2-TD2, cdm8-FD2-TD4}, |
|   density | CHOICE { |
|     dot5 | ENUMERATED {evenPRBs, oddPRBs}, |
|     one | NULL, |
|     three | NULL, |
|     spare | NULL |
|   }, | |
|   freqBand | CSI-FrequencyOccupation, |
|   ... | |
| } | |

A configuration scheme of a downlink codebook may include a codebook configuration scheme corresponding to a single panel and multi panels constituting downlink CSI feedback type 1 and a codebook linear combination based configuration scheme for type 2.

When the CSI and the like are reported using such a codebook, the CSI may be configured as follows.

Elements constituting the CSI may include a CSI-RS resource indicator (CRI), a rank indicator (RI), a channel quality indicator (CQI), and a precoding matrix indicator (PMI).

In the case of the CRI, each resource may be configured/applied with specific analog and/or digital beamforming. In the case of the RI, the maximum number of ranks which may be reported may be decided according to a reception antenna of the UE, which the UE reports to the BS according to a capability. That is, when the RI is less than or equal to N_RX, a bit field of the RI may be decided accordingly.

For example, it may be reported that when the N_Rx is '2', the bit of RI is set to 1 bit, when the N_Rx is '4', the bit of the RI is set to 2 bits, and when the N_Rx is '8', the bit of the RI is set to 3 bits.

Further, for purposes of TRP or panel-to-panel NC-JT, a value of '0' may be reported as RI for TRP/Panel purposes not used for TRP/panel selection purposes.

The PMI is a PMI calculated by using codebooks represented as Type I and Type II and the UE may calculate a PMI which is most preferred/best companion (or worst) on the codebook and report the calculated PMI to the BS and the PMI may become a wideband, sub-band, or partial band (PB) PMI according to reported frequency granularity or expressed as a long-term/short-term PMI according to a reporting cycle.

The CQI is calculated by the UE based on metrics including an SINR calculated using the RS such as the CSI-RS and the codebook and reported to the BS using a CQI table.

CRI

The CRI may be used as a representative value of a Tx Beam index for a single purpose of beam management. In this case, the number 'M' of all Tx beams may be decided by the number 'Na' of antenna constants participating in the TXRU virtualization of the BS and an oversampling value '$O_a$' of the analog beam (for example, $M=N_a O_a$).

Each parameter may be informed to the UE through higher layer signaling or preconfigured.

Alternatively, the BS may configure the number of analog Tx beams in the UE or may be promised between the BS and the UE and in this case, a size of max CIR as $\lceil \log_2 M \rceil$ may be configured/applied in the UE.

In this case, the CRI for beam management may be reported to the BS alone.

CRI+BGI

CRI and beam group index (BGI): In the case of the BGI as an indicator for an RX analog beam group, a Tx beam group corresponding to (alternatively, subjected to spatial QCLed) the Tx beam may be configured by being grouped by a predetermined metric (for example, RXRP, RSRQ, or SINR) or configured for each panel provided in the UE.

Alternatively, the CRI and the BGI may be separately encoded and reported to the BS or may be encoded together and reported to the BS to reduce the overhead of the payload size.

i. CRI+BGI+RSRPI(or CQI)

When the CGI and the BGI are together reported to the BS, an RSRP indicator (RSRPI) may be reported in order to indicate information on RSRP corresponding to the TX beam or a Tx-Rx beam pair in addition to the CIR and the BGI.

In this case, each indicator may be encoded separately or may be encoded together and reported to the BS to reduce the overhead of the payload size.

In order to report the RSRPI together with the CIR and the BGI, a table for the RSRP may be defined separately or the CQI table may be used.

In this case, the UE may calculate the wideband CQI by ignoring the interference or calculate the wideband CQI using the one-shot measurement of the interference and even when the number of ports set for beam management is greater than 1, Rank 1 restriction may be proposed.

This has an advantage of being able to perform fast CQI acquisition.

The BS may inform the UE whether the RSRPI or the CQI is used through the higher layer signaling.

CRI+RSRPI (or CQI)

Similar to a scheme of A-I described above, the UE may report the CRI and RSRPI (or CQI) to the BS together without reporting the BGI.

CRI+PMI

When multiple ports are configured in the CRI and each of the analog beams is configured for each port, the UE needs to separately report information on the ports in each CRI in order to report the preferred Tx beam to the BS.

In this case, a PMI such as a port selection codebook is applied for a port indication and has a wideband nature.

Further, the CRI and PMI may be separately encoded or in the case of a port configuration other than a power of 2, as in the case of 12-port and 24-port, the CRI and the PMI may be encoded together in order to reduce the payload size.

Further, even in such a scheme, there may be a reporting type (e.g., a type CRI, PMI, and RSRPI (or CQI) are separately encoded or together encoded) extensively combined with A and B. Alternatively, when the number of ports used for beam management is set to X ports or less (for example, X=8, configurable), the RI may be extensively applied as the indicator of each port to be used for reporting the CRI and the RI without considering a type in which the CRI and the PMI are additionally encoded.

The CRI may be used mainly for beam management, and a single beam management CSI set {CRI, BGI, RSRPI (or CQI), PMI} corresponding to the best preferred analog beam (set) may be reported to the BS by the UE.

Multiple analog beams may be configured/applied to be reported for a purpose such as a CoMP operation, a purpose (best and worst) of interference control, or beam discovery.

In this case, the number of BM CSI sets (alternatively, BM CSI subsets), BS CSI reporting type (e.g., CSI configured by the BM CSI subset) and corresponding to A, B, and C described above), and BM CSI reporting mode to be reported in the CSI resource configuration may be configured/applied to be individually or integrally applied according to the CSI procedure.

In the case of PUCCH-based reporting, the number of BM CSI configurations to be reported to the same instance in the resource configuration may be set according to the size of the PUCCH container and multiple BM CSI sets which are configured may be reported at once (hereinafter referred to as mode 1) or multiple BM CSI sets which are configured may be reported with the same period/different offsets (mode 2).

In this case, the best BM CSI set has a higher priority than other BM CSI sets. The following is an example of a periodic transmission mode of multiple BM CSI sets or BM CSI subsets and for convenience of description, the following is written only as the BM CSI set and may be referred to as the BM CSI subset.

Mode 1)
  1st instance: BM CSI set_1+BM CSI set_2+ . . . . BM CSI set_1_K (K is configurable)
Mode 2)
  1st instance (w/offset 0): BM CSI set_1
  1st instance (w/offset 1): BM CSI set_2
  . . .
  1st instance (w/offset K−1): BM CSI set_1_K (K is configurable)

CRI based CSI reporting described above may be used not only for BM but also for CSI acquisition like LTE Class B. This may be configured according to CSI process in CSI resource setting or informed to the UE through separate RRC signaling.

Type I PMI

For Type I in the NR downlink codebook, the codebook payload may be represented as in Table 7 below.

TABLE 7

|   |   |   | 2 | | 4 | | 8 (1D) | | 8 (2D) | | 12 (1D) | | 12 (2D) | | 16 (1D) | |
|---|---|---|---|---|---|---|---|---|---|---|---|---|---|---|---|---|
|   |   | x | W1 | W2 | W1 | W2 | W1 | W2 | W1 | W2 | W1 | W2 | W1 | W2 | W1 | W2 |
| rank | 1 | Config 1 | | | 3 | 2 | 4 | 2 | 6 | 2 | 5 | 2 | 7 | 2 | 5 | 2 |
|   |   | Config 2 | | | 2 | 4 | 3 | 4 | 4 | 4 | 4 | 4 | 5 | 4 | 4 | 4 |
|   | 2 | Config 1 | | | 4 | 1 | 6 | 1 | 8 | 1 | 7 | 1 | 9 | 1 | 7 | 1 |
|   |   | Config 2 | | | 3 | 3 | 5 | 3 | 6 | 3 | 6 | 3 | 7 | 3 | 6 | 3 |
|   | 3 |   | | | 3 | 1 | 6 | 1 | 8 | 1 | 7 | 1 | 9 | 1 | 6 | 1 |
|   | 4 |   | | | 3 | 1 | 6 | 1 | 8 | 1 | 7 | 1 | 9 | 1 | 6 | 1 |
|   | 5 |   | | | | | 4 | 1 | 6 | 1 | 5 | 1 | 7 | 1 | 5 | 1 |
|   | 6 |   | | | | | 4 | 1 | 6 | 1 | 5 | 1 | 7 | 1 | 5 | 1 |
|   | 7 |   | | | | | 3 | 1 | | | 5 | 1 | 6 | 1 | 5 | 1 |
|   |   | N2 = 2 | | | | | | | | | | | | | | |
|   | 8 |   | | | | | 3 | 1 | | | 5 | 1 | 6 | 1 | 5 | 1 |

|   |   |   | 16 (2D) | | 24 (1D) | | 24 (2D) | | 32 (1D) | | 32 (2D) | |
|---|---|---|---|---|---|---|---|---|---|---|---|---|
|   |   | x | W1 | W2 | W1 | W2 | W1 | W2 | W1 | W2 | W1 | W2 |
| rank | 1 | Config 1 | 7 | 2 | 6 | 2 | 8 | 2 | 6 | 2 | 8 | 2 |
|   |   | Config 2 | 5 | 4 | 5 | 4 | 6 | 4 | 5 | 4 | 6 | 4 |
|   | 2 | Config 1 | 9 | 1 | 8 | 1 | 10 | 1 | 8 | 1 | 10 | 1 |
|   |   | Config 2 | 7 | 3 | 7 | 3 | 8 | 3 | 7 | 3 | 8 | 3 |
|   | 3 |   | 8 | 1 | 7 | 1 | 9 | 1 | 7 | 1 | 9 | 1 |
|   | 4 |   | 8 | 1 | 7 | 1 | 9 | 1 | 7 | 1 | 9 | 1 |
|   | 5 |   | 7 | 1 | 6 | 1 | 8 | 1 | 6 | 1 | 8 | 1 |
|   | 6 |   | 7 | 1 | 6 | 1 | 8 | 1 | 6 | 1 | 8 | 1 |
|   | 7 |   | 6 | 1 | 6 | 1 | 8 | 1 | 6 | 1 | 8 | 1 |
|   |   | N2 = 2 | | | | | 7 | | | | 7 | |
|   | 8 |   | 6 | 1 | 6 | 1 | 8 | 1 | 6 | 1 | 8 | 1 |
|   |   | N2 = 2 | | | | | 7 | | | | 7 | |

In Table 7, W1 represents a wideband (and or longterm) PMI, W2 represents sub-band (and/or shortterm) PMI, and 1D among the x ports indicates that a port layout of the BS is 1D (for example, N2=1, and N1 and N2 represent the numbers of ports in the 1st and 2nd domains, respectively).

Config 1 is the same as LTE Class A Codebook Config 1, and Config 2 is the same as LTE Class A Codebook Config 2 when Config 2 is 2D, and Config 2 is the same as LTE Class A Codebook Config 4 when Config 2 is 1D.

Only Config 1 may exist in Rank 3 or higher.

Table 8 below shows an example of the configuration of a codebook payload in a multi-panel situation.

TABLE 8

|   |   | 8 (2, 2, 1) | | | | 16 (2, 2, 2) | | | | 16 (2, 4, 1) | | | | 16 (4, 2, 1) | | | |
|---|---|---|---|---|---|---|---|---|---|---|---|---|---|---|---|---|---|
|   | Ng, N1, | mode 1 | | mode 2 | | mode 1 | | mode 2 | | mode 1 | | mode 2 | | mode 1 | | mode 2 | |
| x | N2 | W1 | W2 | W1 | W2 | W1 | W2 | W1 | W2 | W1 | W2 | W1 | W2 | W1 | W2 | W1 | W2 |
| rank | 1 | 5 | 2 | 7 | 4 | 8 | 2 | 10 | 4 | 6 | 2 | 8 | 4 | 9 | | | |
|   | 2 | 6 | 1 | 8 | 3 | 10 | 1 | 12 | 3 | 8 | 1 | 10 | 3 | 10 | | | |
|   | 3 | 5 | 1 | 7 | 3 | 10 | 1 | 12 | 3 | 8 | 1 | 10 | 3 | 9 | | | |
|   | 4 | 5 | 1 | 7 | 3 | 10 | 1 | 12 | 3 | 8 | 1 | 10 | 3 | 9 | | | |

TABLE 8-continued

| 32 (2, 4, 2) | | 32 (4, 2, 2) | | 32 (2, 8, 1) | | 32 (4, 4, 1) | |
|---|---|---|---|---|---|---|---|
| mode 1 | mode 2 | mode 1 | mode 2 | mode 1 | mode 2 | mode 1 | mode 2 |
| W1 W2 | W1 W2 | W1 W2 | W1 W2 | W1 W2 | W1 W2 | W1 W2 | W1 W2 |
|   9    2 | 11        | 4    12    |            | 7    2    | 9          | 4    10    |            |
|  11    1 | 13        | 3    14    |            | 9    1    | 11         | 3    12    |            |
|  10    1 | 12        | 3    14    |            | 8    1    | 10         | 3    12    |            |
|  10    1 | 12        | 3    14    |            | 8    1    | 10         | 3    12    |            |

In Table 8, an X-pol antenna is assumed.

In Table 8, Ng represents the number of panels, and N1 and N2 represent the numbers of antenna ports of the 1st domain and the 2nd domain, respectively in a single panel configuring each of multiple panels.

Therefore, the number of final ports may be 2*Ng*N1*N2 and in the case of the multiple panels, only up to Rank 4 may be defined.

Since the payload size of the PMI in the case of type 1 CSI is smaller than that of the PMI in the case of type 2 CSI, type 1 CSI may be configured/applied even to reporting based on the PUCCH in addition to the PUSCH.

<Proposal 1>

When the UE reports the codebook configuration, codebook config indicator (1 bit CCI) indicating the configuration of the codebook may be encoded separately or together with the RI.

A difference between codebook configurations 1 and 2 is whether the number of groups of beams constituting W1 is 1 or 4. This may also result in whether beam selection is included when the sub-band PMI is configured. Therefore, when the UE is configured in codebook configuration 1 in a channel environment with very large frequency selectivity due to large delay spread, high frequency selectivity may not be sufficiently reflected through the codebook.

In this case, the UE may perform a report (i.e., codebook configuration 2) including beam selection in W2 to sufficiently reflect the high frequency selectivity.

The UE may efficiently control the PMI by additionally reporting the codebook configuration to be used according to the channel environment to the BS through the CCI.

The 1-bit CCI representing the codebook configuration may be distinguished as a kind of PMI, but since the payload of the PMI depends on the codebook configuration, the CCI may be separately encoded or encoded together with the RI.

Such a method may be applied/configured in the PUCCH and/or PUSCH.

<Proposal 2>

When the UE is configured to an MP codebook, an indicator for panel co-phase mode (e.g., 1 bit PCMI) may be encoded separately or together with the RI.

The PMI for the panel co-phase in the MP codebook may be set to mode 1 (wideband co-phase) and mode 2 (wideband and sub-band co-phase).

In particular, when the value of Ng is set to '2', the PMI may be set to mode 2, and when frequency selectivity is low according to a condition of a channel, the UE follows mode 1 and when sub-band panel co-phase reporting is required, the PCMI may be encoded separately or together with the RI in order to use the MP codebook for mode 2.

When the PCMI is encoded separately or together with the RI, there is an effect of payload saving and the PCMI may be configured/applied in the PUCCH and/or the PUSCH.

When two modes may be set for different values of Ng, the UE may report the PCMI to the BS in the same manner as described above and otherwise, the UE operates in mode 1 by default and does not report the PCMI to the BS.

<Proposal 3>

The PMI feedback of the NR may be designed to avoid codebook subsampling where performance degradation is significant even if the PMI feedback is configured to the PUCCH based reporting.

In the case of a single-panel codebook, when a maximum payload size is 32-port 2D layout, RI=3, W1=8, W2=1, and CQI=7 (in the case of ranks 1 to 4, one codeword is used (4 bits) and in the case of ranks 5 to 8, two CSs are used (7 bits)), therefore, a total 19 bits of payload is required for wideband PMI reporting.

Even if the sub-band reporting is considered, a 21-bit payload may be required depending on the value of L (e.g., 2 bits). Therefore, the following modes may be set according to the container size for reporting the RI, the PMI, and the CQI at a time as described below.

In the following modes, the RI may be encoded to a position of most significant bit (MSB) in order to increase protection of the RI.

mode 1-0 (wideband reporting mode)
$1^{st}$ instance: RI+wideband W1+wideband W2+wideband CQI mode 1-1
$1^{st}$ instance: RI
$2^{nd}$ instance: wideband W1+wideband W2+wideband CQI In Mode 1-1, the RI is encoded at the $1^{st}$ instance in order to increase the protection and the $1^{st}$ instance is an integer multiple of the 2 instance.

mode 2-0 (sub-band reporting mode)
$1^{st}$ instance: RI+sub-band W1+sub-band W2+sub-band CQI+R mode 2-1
$1^{st}$ instance: RI+wideband W1+wideband W2+wideband CQI
$2^{nd}$ instance: RI+wideband W1+sub-band W2+sub-band CQI+L mode 2-2
$1^{st}$ instance: RI
$2^{nd}$ instance: wideband W1+sub-band W2+sub-band CQI+L mode 2-3
$1^{st}$ instance: RI+wideband W1
$2^{nd}$ instance: sub-band W2+sub-band CQI+L In Modes 2-1, 2-2, and 2-3, the $1^{st}$ instance is the integer multiple of the $2^{nd}$ instance.

The UE judges through which mode of precoding type of Modes 1-0 and 2-0 the parameters are to be transmitted according to the channel condition to request through which mode to transmit the parameters to the BS and to this end, the UE may additionally perform a 1-bit report to the BS.

In this case, the 1-bit report may be performed while being encoded together with the RI.

For example, the UE may report to the BS through the following modes.

1$^{st}$ instance: (RI+PTI=)+wideband W1+wideband W2+wideband CQI

1$^{st}$ instance: (RI+PTI=1)+sub-band W1+sub-band W2+sub-band CQI+L mode 3 (sub-band reporting mode)

1$^{st}$ instance: RI+wideband W1 and/or (wideband W2+wideband CQI)

2nd instance: (sub-band W2+sub-band CQI)_1+(sub-band W2+sub-band CQI)_2+ . . . +(sub-band W2+sub-band CQI)_K mode 3-1 (sub-band reporting mode)

1$^{st}$ instance: RI+wideband W1+wideband W2+wideband CQI+(sub-band W2+sub-band CQI)_1+(sub-band W2+sub-band CQI)_2+ . . . +(sub-band W2+sub-band CQI)_NSB In Mode 3-1, the sub-band CQI may be given as a differential of the wideband CQI, or given as an equal bitwidth, and NSB represents the number of configured sub-bands.

The 1$^{st}$ instance may be assumed as an integer multiple of the cycle of the 2$^{nd}$ instance.

In the 2$^{nd}$ instance, PMI+CQI corresponding to K (K value is configurable) sub-bands may be reported.

In particular, to reduce the size of the payload for the CQI feedback, the corresponding mode is limited to being set for a UE having a maximum max RI of '4' or less or the BS additionally transmits signaling for the maximum RI report to the UE to implicitly instruct the UE to operate in mode 3.

Alternatively, when the BS explicitly instructs the UE to operate in mode 3, the UE may be operated/configured by using a codebook subset restriction so that max RI operates as '4' even though the UE reports the capability that max RI is '8'.

Signaling for the RI proposal may be used for a purpose for system load balancing and the like.

Alternatively, in order to reduce the payload size of the CQI, a lot of bits may be allocated to the CQI of a first codeword and a CQI for a codeword after a second codeword may be reported with less bits (an index for a difference of the CQI of the first codeword).

Further, it is proposed that mode 3 is configured to codebook configuration 1 to reduce the payload size of W2.

Proposal 3 may be extended and applied by a combination of proposals 1 and 2 and applied to all PUCCH reports of Type 1 CSI feedback including SP and M.

Modes 1, 2, and 3 may be set through a higher layer or may be recommended to the BS in consideration of the channel environment of the UE.

In the above-described PUCCH report, since the maximum payload size may vary depending on the number of ports configured in the UE and/or whether the configuration is the single panel or the multiple panels, a supported PUCCH container size or format may be set differently.

In the case of one instance report based on the PUCCH, when RI+PMI(W1, W2)+CQI or (RI/PMI+CQI) are together encoded, the size of the feedback payload may be reduced.

That is, when the size of the PMI is variable according to the RI (the size of the CQI is variable (e.g., the CQI size of rank 1-4 which is one codeword and the CQI size of rank 5-8 which is two codewords are different), it may be used that PUCCH only reporting is a block code sequence (polar or LDPC code).

In this case, after the RI is decoded first, a decoding result of the RI may be reflected and the PMI may be decoded. For example, in a case where when the RI is '1', the PMI is '10 bits', when the RI is '2', the PMI is '12 bits', the BS first decodes the RI to verify the value of the RI.

When the value of the RI is '1' through decoding of the RI, the BS reflects that the value of the RI is '1' to decode the value of the PMI corresponding to 10 bits.

In this case, a fact that a block length using a block code is not variable according to a length of information (or a message) should be assumed. Therefore, in order to reduce the size of the payload in PUCCH UE report, the RI, the PMI, and/or the CQI may be together encoded.

In particular, in mode 3-1 in which all CSI contents are transmitted in the 1$^{st}$ instance, the size of the payload may be reduced since the RI, the PMI, and the CQI are encoded and reported together according to the method described above.

When such a mode is supported, the payload of the sub-band may be a problem. For this, such a mode may be limited to mode 1 (in both cases, W2 is 2 for rank 1 and W2 is 1 for the others) in the case of codebook configuration 1 or MP).

Alternatively, when a rank restriction is continuously set to 4 or less (in this case, since one codeword is used, the rank restriction may be used for a purpose for adjusting the sub-band CQI payload), a specific mode may be restricted to be used.

As another embodiment of the present invention, a set constituted by multiple payload sizes or formats for blind decoding may be configured in the UE.

In the case of the PUCCH based report, the following options may be considered.

Alt. 1: Encoding RI, CRI, PMI, and CQI together

Alt. 1B: RI/CRI/PMI/CQI having padding bits before encoding (in order to guarantee the same payload regardless of the RI)

In the case of Alt 1, although efficient uplink transmission may be performed by determining the size of the payload adaptively, there is a problem that blind detection must be performed on the number of all possible payloads.

In the case of Alt 1B, decoding may be performed with a single blind detection, but the entire payload is set to the maximum value of all possible cases and when the payload is smaller than the set size, the transmission may be performed with zero-padding.

In this case, uplink resources may be used more than necessary for Alt 1 and uplink power may be relatively increased for achieving a target BLER, so that uplink interference may occur.

Therefore, a certain number of payload sizes or formats may be configured for the UE by considering Alt 1 and Alt 1B together.

In this case, the UE encodes the CSI according to a predetermined number of payload sizes and reports the encoded CSI to the BS and the BS may decode the CSI by performing a blind detection for a specific number of times.

Alternatively, the number of payload sizes may be determined according to the number of configured CSI-RS resources, the number of ports which may include all configured CSI-RSs or a transmissions mode (e.g., wideband/sub-band transmission).

In this case, the size change of the payload depending on the RI in a given port may not be large.

Hereinafter, the PUSCH based CSI reporting will be described.

PUSCH-Based Reporting

Figure 10A:
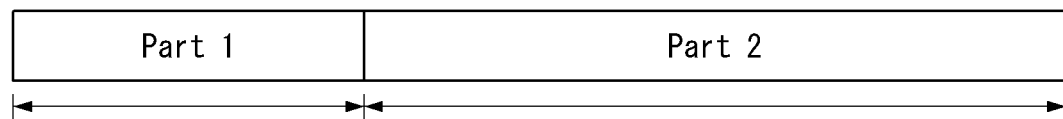
FIGS. 10A and 10B are diagrams illustrating an example of a CSI encoding method proposed in the present specification.
Figure 10B:
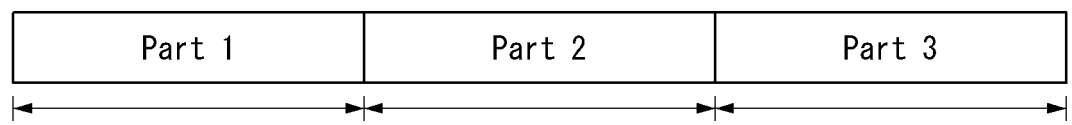

FIGS. 10A and 10B are diagrams illustrating an example of a CSI encoding method proposed in the present specification.

Referring to FIGS. 10A and 10B, the PUSCH-based CSI reporting may be performed by dividing into two or three parts.

When decoding for the DCI is successful, the UE performs aperiodic CSI reporting using the PUSCH of a serving cell c.

The aperiodic CSI reporting performed on the PUSCH supports wideband and sub-band frequency granularity.

The aperiodic CSI reporting performed on the PUSCH supports Type I and Type II CSIs.

When decoding DCI format 0_1 activating a semi-persistent (SP) CSI trigger state is successful, the UE performs SP CSI reporting for the PUSCH.

DCI format 0_1 includes a CSI request field indicating the SP CSI trigger state to be activated or deactivated.

The SP CSI report for the PUSCH supports Type I and Type II CSIs with wideband and sub-band frequency granularity.

The PUSCH resource and the modulation and coding scheme (MCS) for the SP CSI report are semi-permanently allocated by the UL DCI.

The CSI report for the PUSCH may be multiplexed with UL data on the PUSCH.

Further, the CSI reporting for the PUSCH may be performed without multiplexing with the UL data.

In the case of CSI Reporting for the Type II PMI codebook, the payload size for CSI reporting is very large compared to the Type I PMI codebook. Therefore, the CSI reporting for the Type II PMI codebook is not suitable for the PUCCH based CSI Reporting which is very strong against the limit of the payload size and may be configured to operate only as the PUSCH based CSI reporting.

When the PUCCH based CSI reporting is used, L is '2' and wideband CSI reporting assuming co-phase and/or rank 1 restriction may be configured and applied to be performed.

Factors constituting the Type II PMI codebook may include O1*O2 orthogonal set selection (O1 and O2 are individual oversampling factors (oversampling factors for $1^{st}$ and $2^{nd}$ domains), respectively), L beam selections $$\binom{N_1 N_2}{L}$$

which are linearly combined among N1*N2 orthogonal beams given, a strongest beam selection among a total of 2L beams considering the X-pol antenna, and sideband amplitude combining and W2 may be constituted by sub-band phases and amplitude combining of 2L beams.

<Proposal 4>

In the case of the PUSCH based CSI Reporting, the RI, the W1, and W2+CQI may be encoded together and the CRI may be encoded and reported.

In the case of Type II CSI feedback, since the value in the wideband amplitude coefficient (RPI) includes '0', there is a problem that the payload corresponding to the sub-band phase and/or amplitude combining is consumed.

In order to solve the problem, the wideband amplitude alone may be encoded alone or encoded together with the RI.

However, the payload size of the wideband power coefficient is calculated as 3 bits*(2L−1), and even in the case of L of '2' and rank 1, the size is very large as 9 bits and in the case of rank 2, the payload size corresponds to 18 bits, and as a result, a problem may occur, in which protection performance of the RI is lowered in encoding together with the RI (1 bit).

Therefore, the RI and the PMI corresponding to W1 including the wideband power coefficient may be separately encoded and the PMI and the CQI corresponding to W2 may be encoded together.

In the case of a CSI priority considering protection, a priority may be set in the order of the CRI, the RI, the W1, and the W2+CQI.

In such a case, the PMI may be limited to a case using the Type II PMI codebook and when the Type I PMI codebook is used, the PMI may be encoded as the RI and the PMI+CQI or Proposal 4 may be integrally applied to all of the PMI, the RIM, and the PMI+CQI.

When the RI and the W1 are together encoded, the CRI and the RI may be included in MSB for the protection.

In the present invention, the RPI may be included in the PMI as a part of a wideband PMI, but for convenience, the RPI may mean the wideband PMI and the PMI may mean the remaining PMI other than the RPI.

In this case, Equation 4 shows an example of values which may be included in the RPI.

$$RPI \in \{1, \sqrt{0.5}, \sqrt{0.25}, \sqrt{0.125}, \sqrt{0.0625}, \sqrt{0.0313}, \sqrt{0.0156}, 0\} \quad \text{[Equation 4]}$$

Alternatively, in order to prevent or minimize the RPI from being selected '0', the UE may request the BS to reduce the value of L or report the PMI calculated by reducing the value of L to BS, and additionally report that the value of L is changed to the BS.

As yet another embodiment of the present invention, the CSI reporting may be encoded to each of two parts (part 1 and part 2) as illustrated in FIG. 10A.

In this case, parameters encoded in each part may be as follows.

Part 1: RI+RPI
Part 2: PMI+CQI
or
Part 1: RI+RPI+CQI(wideband)
Part 2: PMI+CQI(sub-band, if sub-band reporting mode is configured)
or
Part 1: RI+RPI+CQI
Part 2: PMI The parameters included in each part may have separate fields, respectively and may be encoded through the same coding rate.

Hereinafter, parameters of each part for CSI reporting in the present invention may be encoded by the same method.

When the CSI Reporting is performed in two parts, the RPI may depend on the value of the RI because the bitwidth of the RPI depends on the RI.

In this case, although the complexity increases, the characteristics of the block channel coding may cause the RI to be decoded first and the remaining RPI and/or CQI to be decoded.

When the RI is decoded first, the ambiguity of the change of the payload may be reduced. In order to reduce the dependency to three steps in two steps, the RPI may be assumed as a bitwidth when the RI is '2' and the remaining state or the bitwidth may be subjected to zero-padding when the RI is '1'.

For example, when the bitwidth of the RPI0 is 3 bits*(2L−1)*2 and the RI is 1, information may be included only in bits of 3 bits*(2L−1) and the zero-padding may be performed with respect to the remaining 3 bits*(2L−1) bits.

Alternatively, in order to eliminate the dependency of the payload by the RPI, the UE additionally reports the number of combining beams in which the RPI has the value of '0' to the BS to prevent the entire payload from varying according to the RPI.

That is, when the number of RPIs is (2L−1)*RI and the maximum transmission rank of the Type II PMI codebook is 2, the maximum number of transmission bits may be expressed by Equation 5 below.

$$\lceil \log_2 2(2L-1) \rceil = 1 + \lceil \log_2(2L-1) \rceil \quad \text{[Equation 5]}$$

The feedback bit corresponding to Equation 5 may be referred to as N_RPI0, where L as the codebook configuration parameter indicated by the higher layer signaling represents the number of base vectors (e.g., DFT vectors) linearly coupled in the linear combination based codebook.

In this case, when the value of L is '4', it is possible to inform the number in which the RPI is '0' by 4 bits. For example, when the number in which the RPI is '0' is 2 and the RI is '1', two of the CSIs corresponding to the RPI field may have a value of '0', and as a result, the UE may operate by recognizing that the sub-band PMIs (amplitudes and/or phases) are computed/reported as many as the number of beams.

Alternatively, even when the number of beams in which the RPI is not '0' is reported, the UE may perform an operation similar to the operation described above and the UE may operate by recognizing the sub-band PMIs (amplitudes and/or phases) are computed/reported as many as the number of beams corresponding to the value indicated by N_RPI0.

That is, the bitwidth of the sub-band PMI may be decided by a rank indicator included in part 1 and an indicator indicating the number of relative amplitude coefficients other than '0'.

In the present invention, N_RPI0 is a parameter indicating an indication of the number of non-zero wideband amplitude coefficients per layer for the Type II PMI codebook.

That is, N_RPI0 is an indicator indicating 0 or a relative amplitude coefficient other than 0.

Alternatively, N_RPI0 may represent the number of zero amplitude beams or non-zero amplitude beams and may be referred to as NZBI.

As a result, the value of N_RPI0 is additionally reported by the UE, thereby preventing the payload of the PMI from becoming variable by the RPI.

Alternatively, the payload of N_RPI0 may be set to a specific value (e.g., 2 bits). For example, when the payload of N_RPI0 is specified as 2 bits, the maximum number of beams with the RPI value of '0' that may be reported by the UE may be limited to four.

The method may be applied integrally for each rank or independently of each other.

When the number of beams with the RPI value of '0' is more than 4 (for example, 5) by Type II CSI calculation of the UE, the UE may perform reporting according to a predetermined order.

For example, when the number of beams with the RPI value of '0' is 5, the UE may drop 4 beams with a low index according to a specific ordering rule and the RPI of the 5th beam may operate to represent a value (e.g., $\sqrt{0.0156}$) corresponding to the smallest real number other than '0'.

A method for reporting the number of beams in which the RPI is '0' or not '0' may be represented for each layer. In this case, the maximum number of transmission bits may be $2*\lceil \log_2(2L-1) \rceil$. When L is '4', the number of beams in which the RPI is '0' or not '0' may be reported with a maximum of 6 bits.

When the RI is '1', only first 3 bits are used and the remaining 3 bits may be zero-padded or mapped to a specific value (e.g., a 3-bit state as 000 or 111 may mean that rank 2 is not transmitted) and when the remaining 3 bits are mapped to the specific value, the BS may be preconfigured to ignore the mapped value.

Using such a method, the RI may not be transmitted because the terminal can inform the base station implicitly by RI or implicitly. However, for the high protection of the RI, the value of RI may be transmitted.

Alternatively, the number of beams whose RPI is '0' or not '0' may be indicated by a bitmap of 2*(2L−1) (bitmap per layer). In this case, since there is no ambiguity as to which beam has a value of '0' or a value other than '0', when RPI reporting (wideband amplitude) described below is performed, the number of bits (3 bits) of the value corresponding to '0' may be reduced.

That is, when the number of beams whose RPI is '0' or not '0' is indicated by the bitmap, the PMI may be configured not to be reported in the part of the beam whose RPI value is '0'.

The value of the PMI may include wideband and/or sub-band amplitude and sub-band phase information.

In the case of a method in which a factor indicating the number of zero amplitude beams or non-zero amplitude beams is encoded together with other parameters for the rank or individually or the UE informs the BS through the bitmap, the bitwidth may be decided by assuming rank 2.

In this case, the UE may implicitly inform the BS of the RI. That is, when THE RI is '1', information corresponding to layer 2 indicates a specific value (zero-padding, specific state, etc.), which means that layer 2 is not sent, which causes the BS to implicitly know the rank.

The CSI encoded together through such a method may be divided into part 1 and part 2 as illustrated in FIG. 10A.

In this case, each part may be encoded together with the following parameters.

Part 1: RI+N_RPI0+CQI
Part 2: PMI+RPI
or
Part 1: RI+N_RPI0+wideband CQI
Part 2: PMI+RPI+sub-band CQI
or
Part 1: RI+N_RPI0
Part 2: PMI+RPI+CQI Part 1 may be used to decide the size of Part 2. That is, Part 1 may be used to identify the number of bits of information in Part 2 and the entirety of Part 1 may be transmitted before Part 2.

In other words, the payload size of Part 2 may be decided by parameters (or indicators) included in Part 1.

For example, the BS may recognize the payload size of Part 2 through the parameters (or indicators) included in Part 1.

Thus, Part 1 can have a fixed payload size and Part 2 may vary in payload size depending on the configuration of Part 1.

CSI Reporting may be encoded into three parts (part 1, part 2, and part 3), respectively, as shown in FIG. 10B, unlike FIG. 10A.

When the sub-band CQI is reported together, the payload of the CQI may be very large as 40 bits (assuming # of sub-bands=10 and the CQI is 4 bits), and as a result, the UE may report the CQI separately into the wideband CQI and the sub-band CQI.

In this case, Part 1 may be further protected as compared with the method in which both wideband CQI and sub-band CQI are together reported while being included in Part 1 and the entire payload of Part 1 is be set to 5 bits, so that mapping in a UCI symbol may be more easily performed.

Further, when the sub-band CQI is encoded together in Part 2, the payload sizes of Part 2 and Part 3 may be kept the same or similar, thus providing convenience in mapping the UCI symbol.

In addition, when the sub-band CQI is included in Part 3, the payload size of Part 2 becomes relatively small, so that the protection performance may be enhanced.

An example of CSI Reporting parameters included and encoded in each part is described below.

Part 1: RI+CQI(wideband)
Part 2: RPI+CQI(sub-band)
Part 3: PMI
or
Part 1: RI+CQI(wideband)
Part 2: RPI
Part 3: PMI+CQI(sub-band)

For a codebook for beamformed CSI-RS, Type II below may be configured.

NR may support the extension of Type II Cat 1 CSI for ranks 1 and 2 as shown in Equation 6 below.

$$W_1 = \begin{bmatrix} E_{\frac{X}{2} \times L} & 0 \\ 0 & E_{\frac{X}{2} \times L} \end{bmatrix} \quad \text{[Equation 6]}$$

In Equation 6, X represents the number of CSI-RS ports and L may be constituted by {2,3,4}.

$$E_{\frac{X}{2} \times L}$$

Possible values of X follow Type II SP codebook and may be expressed by Equation 7 below.

$$E_{\frac{X}{2} \times L} = \begin{bmatrix} e^{(\frac{X}{2})}_{mod(md, \frac{X}{2})} & e^{(\frac{X}{2})}_{mod(md+1, \frac{X}{2})} & \cdots & e^{(\frac{X}{2})}_{mod(md+L-1, \frac{X}{2})} \end{bmatrix} \quad \text{[Equation 7]}$$

In Equation 7, $$e_i^{(\frac{X}{2})}$$

denotes a vector having a length $$\frac{X}{2}$$

of 1 for an i-th element and 0 for the remainder.

Port selection: m may have a value of $$\left\{0, 1, \ldots, \left\lceil \frac{X}{2d} \right\rceil - 1\right\}$$

and calculation and reporting of m are wideband $$\left\lceil \log_2 \frac{X}{2d} \text{bits} \right\rceil.$$

The value of d2 may include {1, 2, 3, 4} under conditions of $$d \leq \frac{X}{2}$$

and d≤L.

Amplitude scaling and phase combining coefficients may be configured according to the Type II SP codebook.

In such a scheme, the maximum payload for the value of m corresponding to port selection is X=32 and d=1, so the payload is 4 bits (if the layer is an independent layer, the payload has 8 bits when the RI is '2'), which is a value that is fixed by the X and d values that are configured.

Thus, the PMI of the codebook may be represented by the m value (a value derived by PMI_m), wideband amplitude (a value derived by the RPI), sub-band and/or amplitude (a value derived by the PMI 2).

An encoding method through such a method may be as follows.

First, CSI Reporting may be constituted by three parts as illustrated in FIG. 10B. When PMI_m is commonly used in the layer, Part 1 may be configured by CSI that is not influenced by the RI and in the case of sub-band reporting, Example 1-1 or 1-2 is a method for preventing the payload of the CQI from increasing.

Example 1-3 is an example when PMI_m is commonly used and the protection of Part 1 is further enhanced.

Example 1

Part 1: RI+PMI_m+CQI
Part 2: RPI
Part 3: PMI 2

Example 1-1

Part 1: RI+PMI_m+wideband CQI
Part 2: RPI
Part 3: PMI 2+sub-band CQI

Example 1-2

Part 1: RI+PMI_m+wideband CQI
Part 2: RPI+sub-band CQI
Part 3: PMI 2

Example 1-3

Part 1: RI+PMI_m
Part 2: RPI
Part 3: PMI 2+CQI

Example 1-4

Part 1: RI+PMI_m
Part 2: RPI+wideband CQI
Part 3: PMI 2+sub-band CQI

Example 2 below is an example of a method for configuring the CSI reporting by three parts similarly to Example 1.

When the value of PMI_m is independent of the layer or when the CRI is fed back, the value of PMI_m may be included in Part 2 because the value of PMI_m is affected by the RI.

In this case, Part 1 may be configured by CSI that is not affected by the RI and Example 2-1 or 2-2 is an encoding method for preventing the CQI payload from becoming large in the sub-band reporting. Example 2-3 is an encoding method for maximally enhancing the protection of the RI.

Example 2

Part 1: RI+CQI
Part 2: RPI+PMI_m(W1)
Part 3: PMI 2(W2)

Example 2-1

Part 1: RI+wideband CQI
Part 2: RPI+PMI_m(W1)+sub-band CQI
Part 3: PMI 2(W2)

Example 2-2

Part 1: RI+wideband CQI
Part 2: RPI+PMI_m(W1)
Part 3: PMI 2(W2)+sub-band CQI

Example 2-3

Part 1: RI
Part 2: RPI+PMI_m(W1)
Part 3: PMI 2(W2)+CQI

When encoding is performed by constituting the CSI reporting by three parts, the complexity increases, so that the CSI reporting may be performed while being constituted by two parts as illustrated in FIG. 10A.

In this case, similar to the Type II CSI (non-precoded CSI-RS) described above, the CSI reporting may be configured as follows.

In the case of Example 3, the RI of part 1 is sequentially decoded first, and then the remaining CSI may be decoded.

Example 3-2 may correspond to a method in which a wideband attribute and a sub-band attribute are separately reported.

Example 3

Part 1: RI+RPI+PMI_m+CQI
Part 2: PMI

Example 3-1

Part 1: RI+RPI+PMI_m+wideband CQI
Part 2: PMI2+sub-band CQI

Example 3-2

Part 1: RI+RPI+PMI_m
Part 2: RPI+CQI

Example 4 below shows an example of the CSI reporting method in the case where N_RPI0 is used as described above.

Example 4

Part 1: RI+N_RPI0+PMI_m+CQI
Part 2: PMI+RPI

Example 4-1

Part 1: RI+N_RPI0+CQI
Part 2: PMI+RPI+PMI_m

Example 4-2

Part 1: RI+N_RPI0
Part 2: PMI+RPI+PMI_m+CQI

Example 4-3

Part 1: RI+N_RPI0+wideband CQI
Part 2: PMI+RPI+PMI_m+sub-band CQI

When multiple CSI-RS resources are configured, the RI and the CRI may be encoded together. That is, in Proposal 1, 2, and 3, the CRI may be encoded together in Part 1.

For example, Examples 2 and 4-1 may be configured similarly as Examples 2' and 4-1' as follows.

Example 2'

Part 1: CIR+RI+CQI
Part 2: RPI+PMI_m(W1)
Part 3: PMI 2(W2)

Example 4-1'

Part 1: CRI+RI+N_RPI0+CQI
Part 2: PMI+RPI+PMI_m

In the case of PUSCH-based CSI reporting in Type I CSI, the following example may be applied.

<Option 1>
Part 1: RI/CRI, CQI for first codeword
Part 2: PMI, CQI for second codeword
<Option 2>
Part 1: RI/CRI, wideband CQI for first codeword
Part 2: PMI, sub-band CQIs for first codeword and second codeword for CQI By which method among the above-described examples or options to perform the CSI-reporting may be configured through the higher layer.

Alternatively, By which method among the above-described examples or options to perform the CSI-reporting may be implicitly decided by the number of specific antenna ports or codebook type (e.g., Type I or II and/or single panel or multiple panels).

When the CSI reporting is divided into Part 1 and Part 2, the payload of the CSI included in Part 1 may increase. For example, in the LTE system, Part 1 includes RI and Part 2 includes PMI+CQI.

In this case, the UE is configured by the BS as Type I CSI, sub-band CSI reporting, # of sub-band=10, 4 bit CQI, X=32 port, and codebook configuration of '2' (when the RI is equal to or smaller than 4, codeword 1 (assuming layer mapping for NR codeword) and when the value of the RI is reported as 1, Part 1 is 3 bits and Part 2 is 6(W1)+4(wideband CQI)10*(4(W2)+2(sub-band CQI) as W1=6 bits and W2=4 bits, and as a result, the total size of the payload may be calculated as 70 bits.

When the RI is '3', Part 1 may be 3 bits and Part 2 may be 43 bits as 9(W1) and 4(wideband CQI)+10*(1(W2)+2.

However, when the CSI reporting is performed in Part 1 and Part 2 as follows, each part may be configured as follows.

Part 1: RI/CRI, CQI for first codeword
Part 2: PMI

In this case, when the value of the RI is '1', Part 1 may be 27 bits which is the sum of 3 bits, 4 bits, and 20 bits and Part 2 may be 46 bits which is the sum of 6 bits and 40 bits.

When the RI is '3', Part 1 may be 27 bits and Part 2 may be 19 bits which is the sum of 9 bits and 10 bits.

Table 9 below shows an example of the number of bits of each part according to the RI value.

TABLE 9

|  |  | (Option1)<br>$1^{st}$: RI<br>$2^{nd}$: PMI + CQI | Ratio<br>$1^{st}/2^{nd}$ | Ratio<br>$2^{nd}/(1^{st} + 2^{nd})$ | (Option 2)<br>$1^{st}$: RI + CQI<br>for $1^{st}$ CW<br>2nd: PMI + CQI<br>for $2^{nd}$ CW | Ratio<br>$1^{st}/2^{nd}$ | Ratio<br>$2^{nd}/(1^{st} + 2^{nd})$ |
|---|---|---|---|---|---|---|---|
| RI = 1 | Part 1 | 3 | 0.04 | 0.96 | 27 | 0.59 | 0.63 |
|  | Part 2 | 70 |  |  | 46 |  |  |
| RI = 3 | Part 1 | 3 | 0.07 | 0.93 | 27 | 1.42 | 0.41 |
|  | Part 2 | 43 |  |  | 19 |  |  |

In Table 9, a coded symbol Q' occupied by Part 1 in case of UCI only in the PUSCH transmission may be calculated by Equation 8 below.

$$Q' = \min\left(\left\lceil \frac{O \cdot M_{sc}^{PUSCH} \cdot N_{symb}^{PUSCH} \cdot \beta_{offset}^{PUSCH}}{O_{CQI\text{-}MIN}} \right\rceil, 4 \cdot M_{sc}^{PUSCH}\right) \approx$$ [Equation 8]

$$\frac{O \cdot M_{sc}^{PUSCH} \cdot N_{symb}^{PUSCH} \cdot \beta_{offset}^{PUSCH}}{O_{CQI\text{-}MIN}}$$

In Equation 8, O denotes the number of HARQ-ACK bits or the number of bits of the rank indicator and $O_{CQI\text{-}MIN}$ denotes the number of CQI bits including CRC bits in which the ranks of all serving cells for which aperiodic CSI reporting is triggered is assumed as 1.

M represents a bandwidth scheduled for PUSCH transmission in a current subframe expressed as the number of subcarriers and $N_{symb}^{PUSCH}$ represents the number of SC-FDMA symbols in a current PUSCH transmission subframe given by Equation 9 below.

$$N_{symb}^{PUSCH} = (2 \cdot (N_{symb}^{UL} - 1) - N_{SRS} - N_{start}^{PUSCH} - N_{end}^{PUSCH})$$ [Equation 9]

In Equation 9, $N_{SRS}$ has the value of '1' in the following case.

- Case where the UE is configured to transmit PUSCH and SPS in the same subframe for the current subframe
- Case where PUSCH resource allocation for the current subframe partially overlaps with the cell specific SRS subframe and bandwidth configuration
- Case where the current subframe is a UE-specific type-1 SRS subframe
- Case where the current subframe is a UE-specific type-0 SRS subframe and the UE is constituted by multiple TAGs In other cases, $N_{SRS}$ has the value of '0'.

Equation 8 may be approximated as shown in Equation 10 below and Of the resource elements allocated to the entire PUSCH, an area occupied by the coded symbol of Part 1 may be expressed as a ratio of an integer multiple of the bits (e.g., 70 bits) of Part 1 and Part 2 under the assumption of rank 1.

$$\frac{Q'}{M_{sc}^{PUSCH} \cdot N_{symb}^{PUSCH}} \approx \frac{O}{O_{CQI\text{-}MIN}} \beta_{offset}^{PUSCH}$$ [Equation 10]

As the number of bits in Part 1 increases, the allocated coded symbols increase, and the transmission power of the PUSCH increases to meet the target BLER (for example, 0.1).

However, since the performance of the whole system may be reduced by generating uplink interference, Part 1 may be designed by allocating a small number of bits. Further, since the payload size of Part 2 may be decided by Part 1, reliability of Part 1 may be enhanced through the following method.

In Equation 9, the parameter $$\frac{O}{O_{CQI\text{-}MIN}}$$

for resource mapping may be expressed as $$\frac{O_{1st}}{O_{2nd}}$$

for enhancement of the reliability of Part 1.

In this case, $O_{1st}$ denotes the number of bits of Part 1, and $O_{2nd}$ denotes the number of bits of Part 2 (may include CRC).

In this case, the protection against Part 1 may become difficult in the case of $O_{1st} > O_{2nd}$ because the size change of the payload is large depending on the rank and since the ratio between $O_{1st}$ and $O_{2nd}$ is greater than 1, the resource allocation may become congested if the value of $\beta_{offset}^{PUSCH}$ does not have a positive real number smaller than 1.

In order to solve the congestion, $$\frac{O_{1st}}{O_{2nd}}$$

may be changed to.

$$\frac{O_{1st}}{O_{1st} + O'_{2nd}}$$

In this case, $O'_{2nd}$ may be a minimum value or a maximum value of $O_{2nd}$ or a value of $O_{2nd}$ assuming rank 1.

In this case, the minimum value or the maximum value of $O_{2nd}$ may represent the minimum value or the minimum value of the payload size of Part 2 according to the rank.

In yet another embodiment of the present invention, in the case of Type II, specific Part 1 may be periodically transmitted. When the BS performs the PUSCH based CSI reporting, the BS estimates in advance information (i.e., a hybrid report may also be used in the case of the Type I) of Part 1 based on the periodic report most recently received to allocate a resource for PUSCH transmission.

Therefore, the BS can notify the UE of the ratio of the resources occupied by the CSI parts in advance through the higher layer signaling (for example, using information such as MAC CE or RRC).

When the BS reports the ratio of resources via the DCI, the ratio is encoded along with other information included in the CSI request field to indicate the ratio of resources.

Through such a method, there is an effect that the BS may predict and reflect in advance the CSI omission or the like which may occur when the container size of the PUSCH to which the CSI is to be transmitted is not sufficient.

Alternatively, the BS may inform the UE of the value of $O'_{2nd}$ in the value of $$\frac{O_{1st}}{O_{1st} + O'_{2nd}}$$

or the value of may be calculated as a value corresponding to a rank which most (or least) occupies the payload among values equal to or less than the maximum RI value by assuming the RI indicated by the RI value of the periodic reporting as the maximum RI.

Still yet another embodiment of the present invention proposes transmission methods for CSI reporting as follows.

<Proposal 4>

The parts for CSI reporting may be encoded with different modulation orders and/or coding rates for each part.

Specifically, when the payload size of each part is greater than or equal to a specific size (for example, 11 bits), a CRC bit of a specific length (for example, 8 bits) is inserted to check whether decoding is successful.

Alternatively, all parts may be fixedly transmitted while being inserted with the CRC bits and the length of the CRC bit may be different for each part.

For example, the CRC bit is set to be larger for Part 1 than Part 2 to increase the reliability.

Further, Part 1 may be mapped using QPSK modulation and Part 2 may be mapped using 16QAM modulation.

<Proposal 5>

In each part for CSI reporting, different transmission power may be set.

That is, in the case of CP-OFDM, each part is transmitted by setting different transmission power for each resource element to which each part is mapped to enhance the reliability.

<Proposal 6>

The RI of Part 1 and/or the RPI of Part 2 may be repeatedly transmitted with a specific number of bits.

That is, other CSI parameters that are encoded together are transmitted in a single transmission without repetition, and the RI and/or RPI may be encoded such that the same value may be repeatedly transmitted.

For example, the RI of Type II is 1 bit and when the RI is continuously set to be transmitted in 3 bits, the same three RI values are included in Part 1 and encoded and transmitted along with parameters for other CSI reporting, thereby enhancing the reliability.

In Proposal 4-6, the coded information sizes of Part 1 and Part 2 are decided according to the existing LTE scheme and in the case of power control, the coded information sizes may also be given as a ratio of Part 2 bits/total resource elements as shown in Equation 11 below.

$$BPRE = O_{CQI}/N_{RE} \quad \text{[Equation 11]}$$

In this case, when using Option 2 proposed above, comparing the payloads when the RI is '1' and when the RI is '3', Part 2 may change abruptly according to the RI value, so that when the RI is '3', a decoding capability of the CSI in Part 1 may be significantly degraded.

Therefore, when a method in which the ratio of the payload sizes of Part 1 and Part 2 is not significantly large as in Option 2 is used, the uplink power control of the UE may be configured as a ratio of the payload size of a part having the larger payload size of Part 1 and Part 2 and all transmission REs as shown in Equation 12 below.

$$BPRE = O_{max}/N_{RE}, O_{max} = \max(O_{1st}, O_{2nd}),$$

$O_i$=bits for $i$-th part CSI including CRC according to reported RI [Equation 12]

In case of Type II CSI, since the payload of the part including the PMI is the largest, when the CSI reporting is constituted by two parts, $O_{max} = O_{2nd}$ and when the CSI reporting is constituted by three parts, $O_{max} = O_{3rd}$.

As still yet another embodiment of the present invention, BPRE may be configured as shown in Equation 13 below.

$$BPRE = O_{max}/N_{RE}, O_{max} = \max(O_{2nd}^{(r)}), \forall r=1,\ldots,\max\,(\text{rank})$$

$O_{2nd}^{(r)}$=bits for 2nd part CSI at rank $r$ including CRC [Equation 13]

In the case of Equation 13, in Option 2, $O_{max}$ may be a value obtained by adding CRC bits to 46 bits.

As still yet another embodiment of the present invention, BPRE may be configured as shown in Equation 14 below.

$$BPRE = O_{min}/N_{RE}, O_{min} = \min(O_{2nd}^{(r)}), \forall r=1,\ldots,\max\,(\text{rank})$$

$O_{2nd}^{(r)}$=bits for 2nd part CSI at rank $r$ including CRC [Equation 14]

In the case of Equation 14, in Option 2, $O_{max}$ may be a value obtained by adding CRC bits to 19 bits.

As still yet another embodiment of the present invention, BPRE may be configured as shown in Equation 15 below.

$$BPRE = O_{max}/N_{RE}, O_{max} = \max(O_{1st}^{(r)} + O_{2nd}^{(r)}), \forall r = 1,\ldots,\max(\text{rank})$$

$O_{i\text{-}th}^{(r)}$=bits for $i$-th part CSI at rank $r$ including CRC [Equation 15]

In the case of Equation 15, in Option 2, $O_{max}$ may be a value obtained by adding CRC bits to 73 bits. Alternatively, a specific rank (e.g., r=1) may be preconfigured.

As still yet another embodiment of the present invention BPRE may be configured as shown in Equation 16 below.

$$BPRE = O_{min}/N_{RE}, O_{min} = \min(O_{1st}^{(r)} + O_{2nd}^{(r)}), \forall r = 1, \ldots, \max(\text{rank})$$

$O_{i\text{-}th}^{(r)}$=bits for $i$-$th$ part CSI at rank $r$ including CRC  [Equation 16]

In the case of Equation 16, in Option 2, $O_{max}$ may be a value obtained by adding CRC bits to 46 bits. Alternatively, a specific rank (e.g., r=1) may be preconfigured.

The value of $O_{i\text{-}th}^{(r)}$ in the embodiment may be applied to the size of the payload calculated after CSI omission is reflected if some CSI parameters are omitted (e.g., PMI of a specific sub-band, etc.). That is, the value of $O_{i\text{-}th}^{(r)}$ needs to be calculated as the payload size of the actually transmitted CSI.

When such a method is used, it is possible to prevent degradation of the decoding performance of Part 1 due to CSI of Part 2 and/or Part 3 that varies according to the RI.

As still yet another embodiment of the present invention, parameters for CSI reporting transmitted in a UCI symbol piggy-backed on the PUSCH are divided into two or three parts as described above and the parameters included in each part may be encoded together.

In case of the PUSCH transmission, Ack/Nack information may be included and transmitted as well as the parameters for the CSI reporting or only the parameters for the CSI reporting may be included and transmitted.

When only the parameters for the CSI reporting are transmitted, the importance (or priority) for the CSI reporting is high in order of Part 1, Part 2, and Part 3, and may be mapped around a symbol to which a demodulation reference signal (DMRS) is mapped according to a higher importance order.

The DMRS may be referred to as front-loaded DMRS and additional DMRS depending on the location of the mapped symbol.

Specifically, the DMRS located in the front symbol of the slot for fast decoding may be referred to as the front-loaded DMRS and the DMRS additionally configured for channel compensation may be referred to as the additional DMRS.

In this case, the additional DMRS may be selectively mapped to the symbol.

The parameters for the CSI reporting may be mapped according to four methods.

First, when the CSI reporting is performed separately in two parts, Part 1 may be mapped to a near-symbol of the front-loaded DMRS and when the additional DMRS is configured, Part 2 may be mapped to a near-symbol of the symbol to which the additional DMRS is mapped.

Specifically, Part 1 may be sequentially mapped to the next symbol in the direction in which the index of the symbol to which the front-loaded DMRS is mapped increases.

For example, when the front-loaded DMRS is transmitted while being mapped to third and fourth symbols, the UCI symbol in which Part 1 is piggy-backed may be mapped to fifth and sixth symbols.

Part 2 may be mapped to symbols on both sides of the symbol to which the additional DMRS is mapped when the additional DMRS is mapped to one or more symbols.

For example, when the additional DMRS is transmitted while being mapped to a tenth symbol, Part 2 is sequentially mapped to 9th, 11th, 8th, and 12th symbols or mapped to the $11^{th}$ symbol, $12^{th}$ symbol, ... which is the direction in which the index increases.

When a conflict occurs with another part during mapping, a part with a high importance (or priority) may be mapped first and a part with a low importance may be mapped to the next candidate symbol.

Part 3 may be mapped sequentially to symbols on both sides based on two or more symbols if the additional DMRS is mapped to two or more symbols.

If no additional DMRS is configured or if the additional DMRS is mapped to a single symbol, the higher priority part may be mapped to the next symbol of the mapped symbol in turn.

When Part 2 is transmitted over multiple slots, Part 1 of the CSI piggybacked to the UCI symbol may be particularly transmitted in a first slot of the multi-slots transmitted to the UCI symbol.

That is, Part 1 may not separately be mapped into multiple slots.

Second, the parts may be mapped to the next symbol of the symbol to which the front-loaded DMRS and the additional DMRS (if configured) are mapped in the lower part order (higher importance part) and thereafter, the higher index part may be mapped.

For example, when the front-loaded DMRS is transmitted while being mapped to the third symbol, the additional DMRS is transmitted while being mapped to the 7th and 10th symbols, and each of the parameters for the CSI reporting constituted by two parts occupies 3 UCI symbols, Part 1 may be mapped to 4th, 6th, and 8th symbols, and Part 2 may be mapped to 9th, 11th, and 5th symbols.

If no additional DMRS is configured, Part 1 may be mapped to the fourth, fifth, and sixth symbols and Part 2 may be transmitted while being mapped to the 7th, 8th, and 9th symbols.

In this case, if Part 1 is mapped into a specific symbol (e.g., 1 symbol), Part 1 may be transmitted while being mapped to a symbol near all of the DMRSs (front-loaded DMRS and additional DMRS) to increase the protection of Part 1. That is, when the additional DMRS is configured, Part 1 may be repeatedly transmitted and Part 2 and/or Part 3 may be transmitted only once.

Third, if Part 1 is repeatedly transmitted as in the second case or the additional DMRS is configured, the decoding performance may be degraded to a high Doppler environment.

Therefore, when the additional DMRS is configured, Part 1 may be transmitted by lowering the coding rate.

In particular, for protection of Part 1, only the parameters contained in Part 1 may be transmitted at a lower coding rate.

Fourth, in the case of the symbols to which the parameters for the CSI reporting may be sequentially mapped, the parts may be sequentially mapped from the next symbol of the symbol to which the front-loaded DMRS is mapped in order to quickly process the CSI decoding and rapidly download a downlink grant to the UE.

That is, the respective parts for the CSI reporting may be mapped sequentially from the next symbol of the symbol to which the front-loaded DMRS is mapped according to the priority.

For example, when the front-loaded DMRS is transmitted while being mapped to the third symbol and a control channel is mapped to the 0th, 1st, and 2nd symbols, the parameters for the CSI reporting may be sequentially mapped from the 4th symbol.

Alternatively, when the control channel is mapped to the $0^{th}$ and 1st symbols, the parameters for the CSI reporting may be sequentially mapped in the order of the 2nd, 4th, and 5th symbols.

When using such an encoding method, in an encoding method corresponding to Part 1, transmission may be performed in all layers to be transmitted in order to enhance the reliability and Part 1 and/or Part 3 may be configured to be transmitted only in a specific layer (for example, layers 1 and 2).

This makes it possible to enhance the throughput of data when the data and the UCI are multiplexed because the size of the PMI occupies a large part in the payload.

If the parameters for the CSI reporting are mapped using the method described above, Part 1 may take precedence over Part 2, depending on the importance thereof.

In this case, if Part 2 is not transmitted in one slot due to the too large size of the payload of Part 2, some parameters (e.g., PMI, etc.) of Part 2 for the CSI reporting may be dropped.

Figure 11:
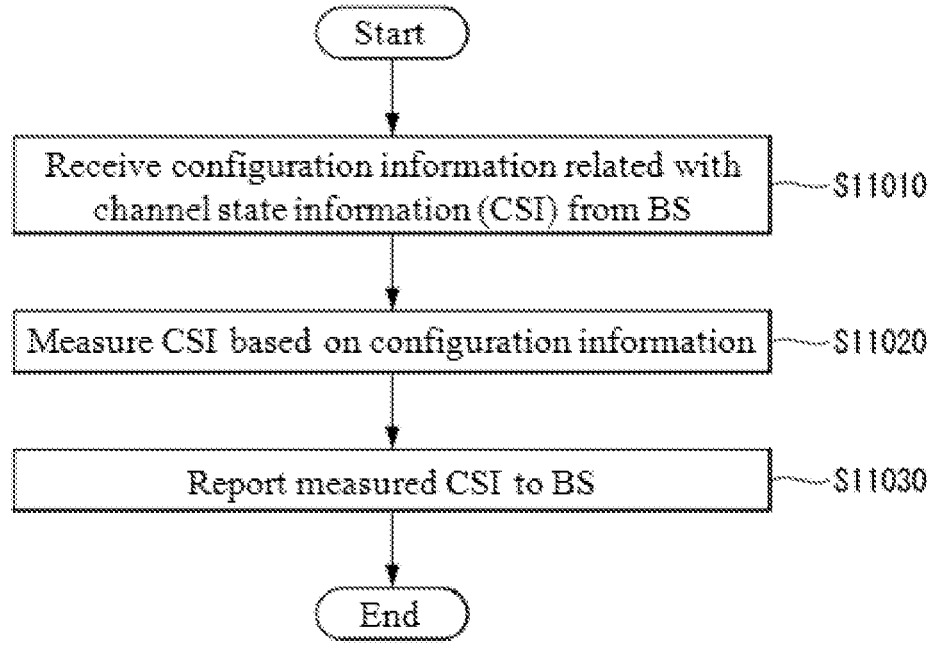
FIG. 11 is a flowchart illustrating an example of a CSI reporting method proposed in the present specification.

FIG. 11 is a flowchart illustrating an example of a CSI reporting method proposed in the present specification.

Referring to FIG. 11, the UE receives configuration information related to the CSI from the BS (S1010). The UE may recognize the reporting method, the parameter to be reported, and the like through the configuration information.

Thereafter, the UE may measure the CSI based on the configuration information and report the measured CSI to the BS (S11020 and S11030).

The CSI reporting may be performed separately in two or three parts as described in FIGS. 9 to 10B.

That is, when the CSI is constituted by the first part and the second part or constituted by the first part to the third part, each part may be constituted by Proposals 1 to 3, Examples 1 to 4, or Options 1 and 2.

For example, if the CSI is constituted by the first part and the second part, the first part may include a rank indicator (RI), a channel quality indicator (CQI), and an indicator indicating the number of beams having the amplitude other than 0 and the second part may include a precoding matrix indicator (PMI).

Further, each part for the CSI reporting may be transmitted while being from the next symbol of the symbol to which the DMRS is mapped according to the priority as described above.

As another embodiment of the present invention, when the Ack/Nack information is included in the PUSCH transmission, the Ack/Nack information may be mapped to the symbol prior to the parameters for the CSI reporting.

For example, when the Ack/Nack information is included in the PUSCH transmission, the Ack/Nack information may be transmitted while being mapped to the symbol prior to Part 1 having the highest priority.

General Apparatus to which Present Invention is Applicable

Figure 12:
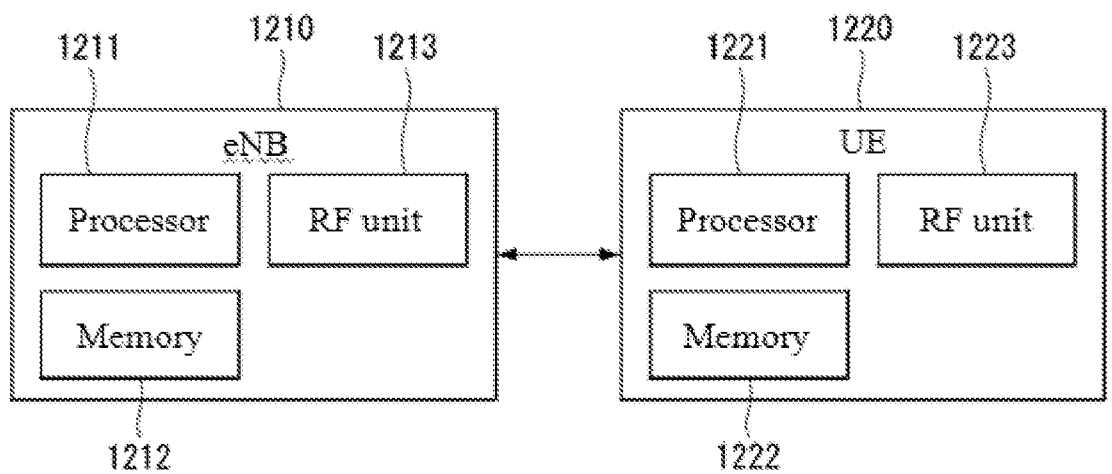
FIG. 12 illustrates a block diagram of a wireless communication device to which methods proposed in the present specification may be applied.

FIG. 12 illustrates a block diagram of a wireless communication device to which methods proposed in the present specification may be applied.

Referring to FIG. 12, a wireless communication system includes a BS 1210 and multiple UEs 1210 positioned within an area of the BS 1220.

Each of the BS and the UE may be expressed as a wireless device.

The BS 1210 includes a processor 1211, a memory 1212, and a radio frequency (RF) module 1213. The processor 1211 implements a function, a process, and/or a method which are proposed in FIGS. 1 to 12 above. Layers of a radio interface protocol may be implemented by the processor. The memory 1212 is connected with the processor to store various information for driving the processor. The RF module 1213 is connected with the processor to transmit and/or receive a radio signal.

The UE 1220 includes a processor 1221, a memory 1222, and an RF module 1223.

The processor 1221 implements a function, a process, and/or a method which are proposed in FIGS. 1 to 12 above. Layers of a radio interface protocol may be implemented by the processor.

The memory 1222 is connected with the processor to store various information for driving the processor. The RF module 1923 is connected with the processor to transmit and/or receive a radio signal.

The memories 1212 and 1222 may be positioned inside or outside the processors 1211 and 1221 and connected with the processors 1211 and 1221 by various well-known means.

Further, the BS 1210 and/or the UE 1220 may have a single antenna or multiple antennas.

Figure 13:
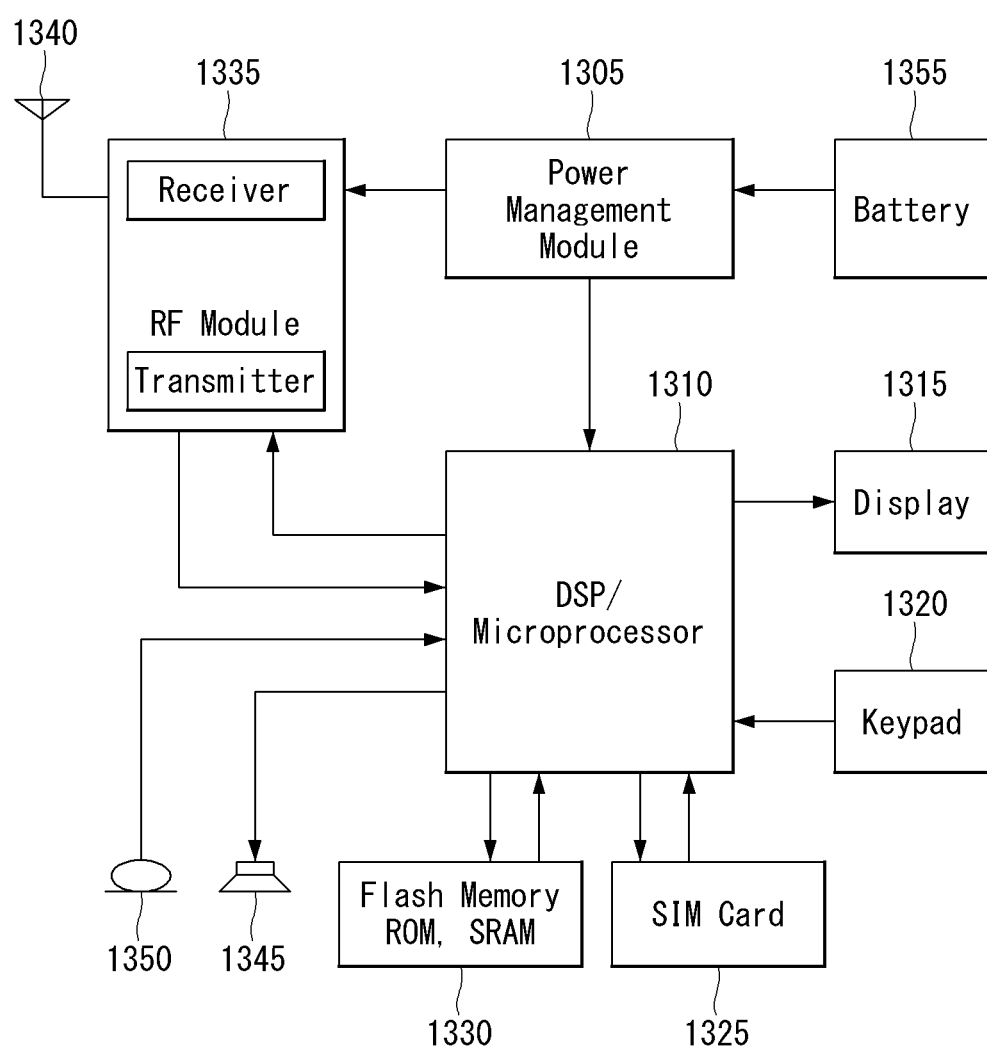
FIG. 13 illustrates a block diagram of a communication device according to an embodiment of the present invention.

FIG. 13 illustrates a block diagram of a communication device according to an embodiment of the present invention.

In particular, FIG. 13 is a diagram more specifically illustrating the UE of FIG. 12 above.

Referring to FIG. 13, the UE may be configured to include a processor (or a digital signal processor (DSP) 1310, an RF module (or RF unit) 1335, a power management module 1305, an antenna 1340, a battery 1355, a display 1315, a keypad 1320, a memory 1330, a subscriber identification module (SIM) card 1325 (This component is optional), a speaker 1345, and a microphone 1350. The UE may also include a single antenna or multiple antennas.

The processor 1310 implements a function, a process, and/or a method which are proposed in FIGS. 9 and 11 above. Layers of a radio interface protocol may be implemented by the processor.

The memory 1330 is connected with the processor and stores information related with an operation of the processor. The memory 1330 may be positioned inside or outside the processor and connected with the processor by various well-known means.

A user inputs command information such as a telephone number or the like by, for example, pressing (or touching) a button on the keypad 1320 or by voice activation using the microphone 1350. The processor receives such command information and processes to perform appropriate functions including dialing a telephone number. Operational data may be extracted from the SIM card 1325 or the memory 1330. In addition, the processor may display command information or drive information on the display 1315 for the user to recognize and for convenience.

The RF module 1335 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1340 functions to transmit and receive the radio signals. Upon receiving the radio signals, the RF module may transfer the signal for processing by the processor and convert the signal to a baseband. The processed signal may be converted into to audible or readable information output via the speaker 1345.

Figure 14:
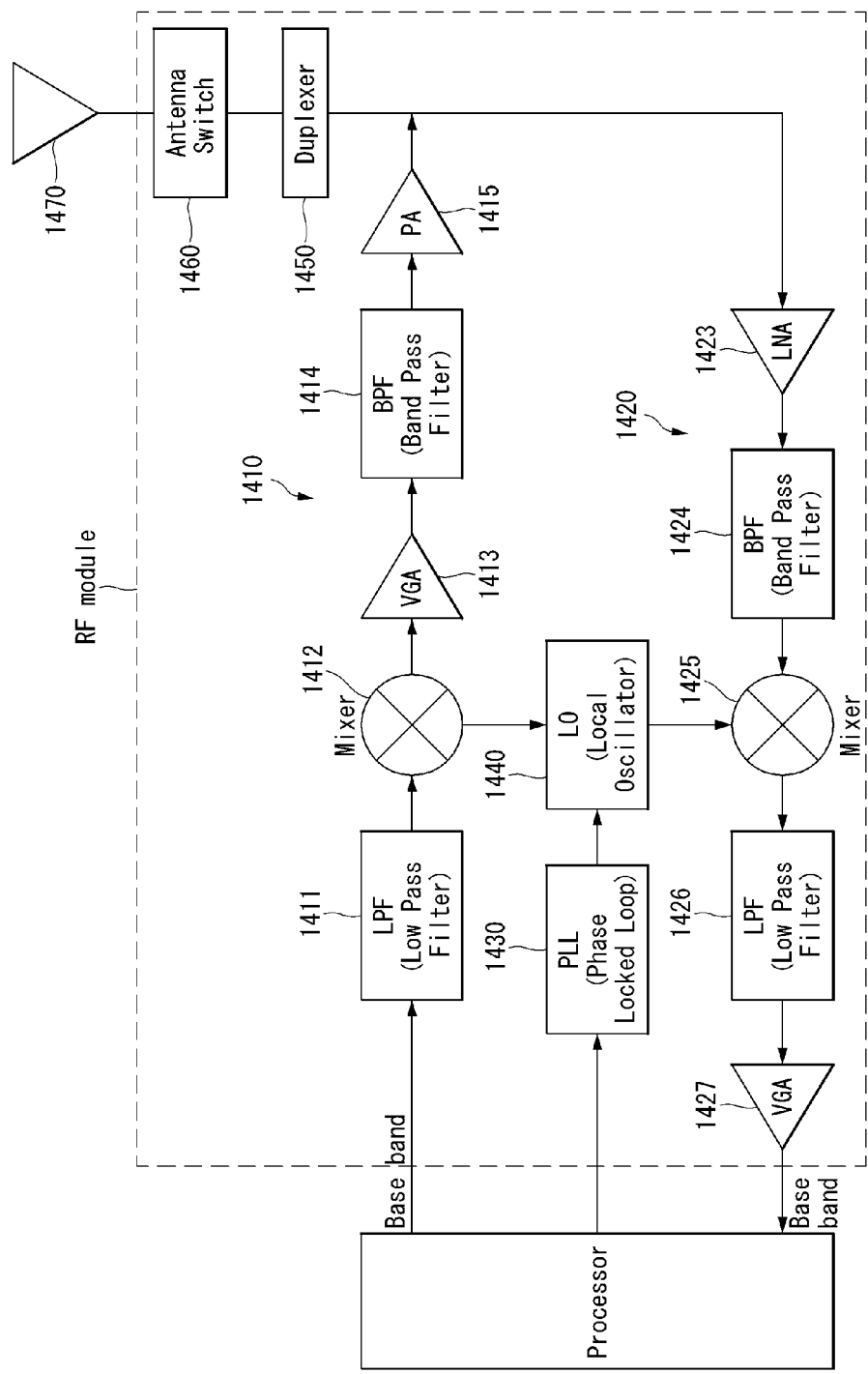
FIG. 14 is a diagram illustrating an example of an RF module of the wireless communication device to which the method proposed in the present specification may be applied.

FIG. 14 is a diagram illustrating an example of an RF module of the wireless communication device to which the method proposed in the present specification may be applied.

Specifically, FIG. 14 illustrates an example of an RF module that may be implemented in a frequency division duplex (FDD) system.

First, in a transmission path, the processors described in FIGS. 13 and 14 process the data to be transmitted and provide an analog output signal to the transmitter 1410.

Within the transmitter 1410, the analog output signal is filtered by a low pass filter (LPF) 1411 to remove images caused by a digital-to-analog conversion (ADC) and up-converted to an RF from a baseband by an up-converter (mixer) 1412, and amplified by a variable gain amplifier (VGA) 1413 and the amplified signal is filtered by a filter 1414, additionally amplified by a power amplifier (PA) 1415, routed through a duplexer(s) 1450/an antenna switch(es) 1460, and transmitted through an antenna 1470.

In addition, in a reception path, the antenna 1470 receives signals from the outside and provides the received signals, which are routed through the antenna switch(es) 1460/duplexers 1450 and provided to a receiver 1420.

In the receiver 1420, the received signals are amplified by a low noise amplifier (LNA) 1423, filtered by a bans pass filter 1424, and down-converted from the RF to the baseband by a down-converter (mixer) 1425.

The down-converted signal is filtered by a low pass filter (LPF) 1426 and amplified by a VGA 1427 to obtain an analog input signal, which is provided to the processors described in FIGS. 12 and 13.

Further, a local oscillator (LO) generator 1440 also provides transmitted and received LO signals to the up-converter 1412 and the down-converter 1425, respectively.

In addition, a phase locked loop (PLL) 1430 receives control information from the processor to generate the transmitted and received LO signals at appropriate frequencies and provides control signals to the LO generator 1440.

Further, circuits illustrated in FIG. 14 may be arranged differently from the components illustrated in FIG. 14.

Figure 15:
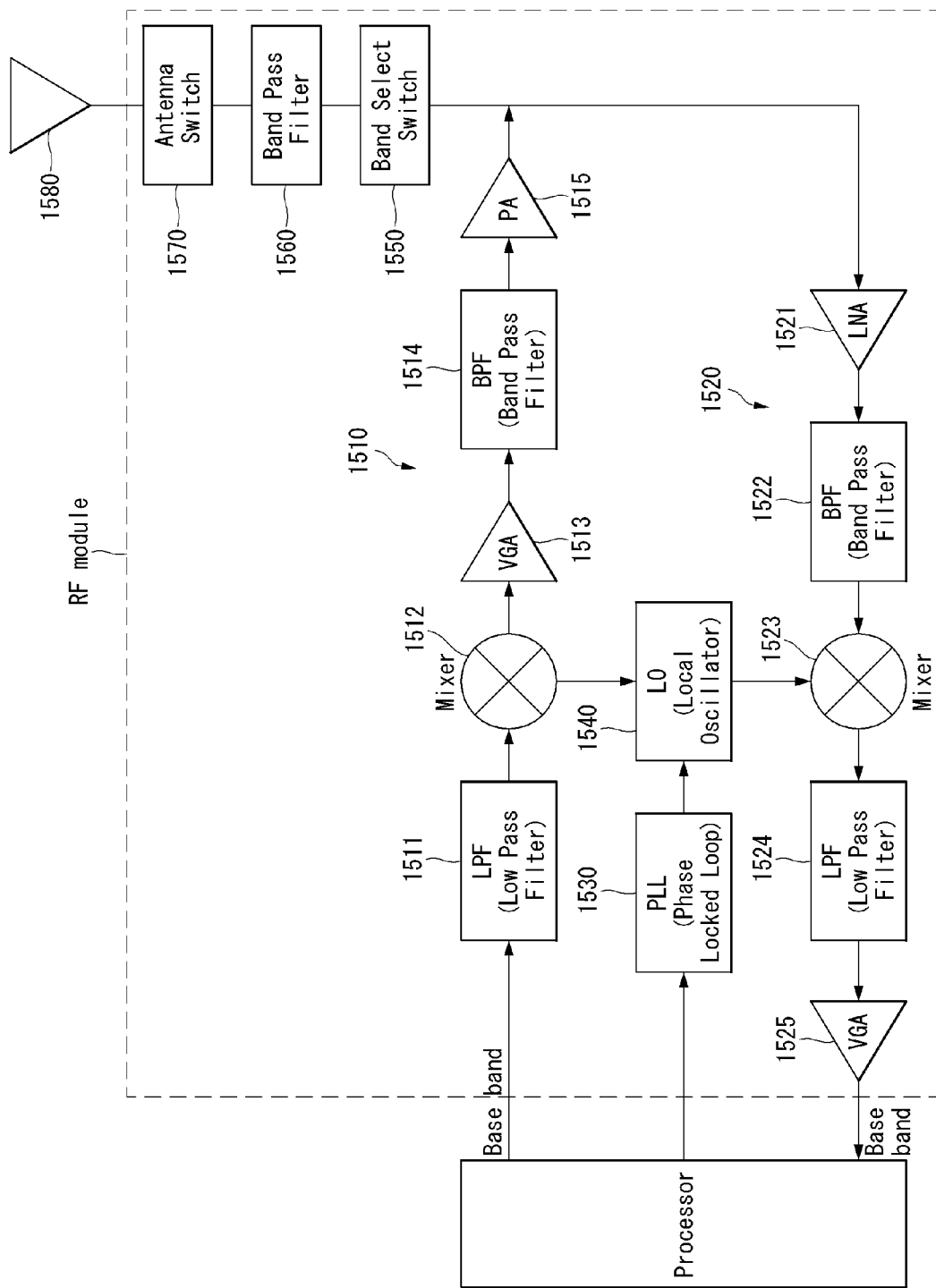
FIG. 15 is a diagram illustrating another example of the RF module of the wireless communication device to which the method proposed in the present specification may be applied.

FIG. 15 is a diagram illustrating another example of the RF module of the wireless communication device to which the method proposed in the present specification may be applied.

Specifically, FIG. 15 illustrates an example of an RF module that may be implemented in a time division duplex (TDD) system.

A transmitter 1510 and a receiver 1520 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 14.

A signal amplified by a power amplifier (PA) 1515 of the transmitter is routed through a band select switch 1550, a band pass filter (BPF) 1560, and an antenna switch(es) 1570 and transmitted via an antenna 1580.

In addition, in a reception path, the antenna 1580 receives signals from the outside and provides the received signals, which are routed through the antenna switch(es) 1570, the band pass filter 1560, and the band select switch 1550 and provided to the receiver 1520.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

Although a scheme of mapping a reference signal in a wireless communication system of the present invention has been described with reference to an example applied to a 3GPP LTE/LTE-A system or a 5G system (New RAT system), the scheme may be applied to various wireless communication systems in addition to the 3GPP LTELTE-A system or 5G system.

According to an embodiment of the present invention, since a payload size of CSI can be decided according to a configuration scheme of the CSI, the payload size of the CSI can be optimized.

Further, according to an embodiment of the present invention, the CSI is mapped to a next symbol of a DMRS according to a priority so as to preferentially decode CSI having high importance.

In addition, DL Grant can be efficiently allocated to a terminal by preferentially decoding the CSI having the high importance.

Advantages which can be obtained in the present invention are not limited to the aforementioned advantages and other unmentioned advantages will be clearly understood by those skilled in the art from the following description.

What is claimed is:

1. A method of reporting, by a user equipment (UE), a channel state information (CSI) report in a wireless communication system, the method comprising:
    receiving, from a base station (BS), configuration information related with the CSI report;
    calculating at least one CSI parameter based on the configuration information; and reporting, to the BS, the CSI report including the at least one CSI parameter, wherein the CSI report is (a) one of (i) Type I CSI feedback and (ii) Type II CSI feedback and (b) comprises two parts including a first part and a second part, wherein based on the CSI report being the Type I CSI feedback:
- the first part of the CSI report includes a rank indicator (RI), a CSI-RS resource indicator (CRI), and a first channel quality indicator (CQI) for a first codeword, and
- the second part of the CSI report includes a precoding matrix indicator (PMI), and a second CQI for a second codeword, and wherein based on the CSI report being the Type II CSI feedback:
- the first part of the CSI report includes the rank indicator (RI), a CQI, and an indicator for a number of non-zero wideband amplitude coefficients per layer, and
- the second part of the CSI report includes a precoding matrix indicator (PMI),
- wherein a bitwidth of the indicator for the number of non-zero amplitude coefficients is configured for each layer based on the following equation, $\lceil \log_2 2L-1 \rceil$,
- wherein L is number of beams, and
- wherein L vectors are combined by a codebook.

2. The method of claim 1, wherein a payload size of the second part is identified by the first part.

3. The method of claim 2, wherein a bitwidth of the PMI is determined based on the RI and the indicator for the number of non-zero amplitude coefficients.

4. The method of claim 1, wherein the CSI is transmitted on a physical uplink shared channel (PUSCH), and
wherein transmission power of the CSI increases as the bitwidth of the first part increases.

5. The method of claim 1, wherein the RI, the CQI, and the indicator for the number of non-zero amplitude coefficients are each encoded through a same coding rate with separate field in the first part.

6. The method of claim 1, wherein the indicator for the number of non-zero amplitude coefficients is independently configured for each layer.

7. The method of claim 1,
wherein the first part has a higher CSI priority than the second part, and
wherein the first part and the second part are mapped to a symbol next a symbol to which a demodulation reference signal (DMRS) is mapped according to the CSI priority.

8. The method of claim 7, wherein the first part and the second part are sequentially mapped in a direction in which an index of the symbol to which the DMRS is mapped increases.

9. The method of claim 1, wherein the number of symbols to which the first part is mapped is determined based on the bitwidth of the first part and the bitwidth of the second part.

10. The method of claim 1, wherein the first part and the second part are each separately encoded.

11. The method of claim 1,
wherein the first part and the second part are transmitted through different transmission powers, and
wherein specific values of the first part and/or the second part are/is repeatedly transmitted.

12. A user equipment (UE) for reporting a channel state information (CSI) report in a wireless communication system, the UE comprising:
one or more transceivers transmitting and receiving a radio signal; and
one or more processors controlling the one or more transceivers,
wherein the one or more processors are configured to:
receive, from a base station (BS), configuration information related with the CSI report;
calculate at least one CSI parameter based on the configuration information; and
report, to the BS, the CSI report including the at least one CSI parameter,
wherein the CSI report is (a) one of (i) Type I CSI feedback and (ii) Type II CSI feedback and (b) comprises two parts including a first part and a second part,
wherein based on the CSI report being the Type I CSI feedback:
- the first part of the CSI report includes a rank indicator (RI), a CSI-RS resource indicator (CRI), and a first channel quality indicator (CQI) for a first codeword, and
- the second part of the CSI report includes a precoding matrix indicator (PMI), and a second CQI for a second codeword, and wherein based on the CSI report being the Type II CSI feedback:
- the first part of the CSI report includes the rank indicator (RI), a CQI, and an indicator for a number of non-zero wideband amplitude coefficients per layer, and
- the second part of the CSI report includes a precoding matrix indicator (PMI),
- wherein a bitwidth of the indicator for the number of non-zero amplitude coefficients is configured for each layer based on the following equation, $\lceil \log_2 2L-1 \rceil$, and
- wherein L denotes a number of vectors combined by a codebook.

13. A method of receiving, by a base station (BS), a channel state information (CSI) report in a wireless communication system, the method comprising:
transmitting, to a user equipment(UE), configuration information related with the CSI report;
receiving, from the UE, the CSI report,
wherein the CSI report is (a) one of (i) Type I CSI feedback and (ii) Type II CSI feedback and (b) comprises two parts including a first part and a second part,
wherein based on the CSI report being the Type I CSI feedback:
- the first part of the CSI report includes a rank indicator (RI), a CSI-RS resource indicator (CRI), and a first channel quality indicator (CQI) for a first codeword, and
- the second part of the CSI report includes a precoding matrix indicator (PMI), and a second CQI for a second codeword, and wherein based on the CSI report being the Type II CSI feedback:
- the first part of the CSI report includes the rank indicator (RI), a CQI, and an indicator for a number of non-zero wideband amplitude coefficients per layer, and
- the second part of the CSI report includes a precoding matrix indicator (PMI), wherein a bitwidth of the indicator for the number of non-zero amplitude coefficients is configured for each layer based on the following equation, $\lceil \log_2 2L-1 \rceil$,
wherein L is number of beams, and
wherein L vectors are combined by a codebook.

14. A base station (BS) for receiving a channel state information (CSI) report in a wireless communication system, the BS comprising:
one or more transceivers transmitting and receiving a radio signal; and
one or more processors controlling the one or more transceivers,
wherein the one or more processors are configured to:
transmit, to a user equipment(UE), configuration information related with the CSI report;
receive, from the UE, the CSI report,
wherein the CSI report is (a) one of (i) Type I CSI feedback and (ii) Type II CSI feedback and (b) comprises two parts including a first part and a second part,
wherein based on the CSI report being the Type I CSI feedback:
the first part of the CSI report includes a rank indicator (RI), a CSI-RS resource indicator (CRI), and a first channel quality indicator (CQI) for a first codeword, and
the second part of the CSI report includes a precoding matrix indicator (PMI), and a second CQI for a second codeword, and
wherein based on the CSI report being the Type II CSI feedback:
the first part of the CSI report includes the rank indicator (RI), a CQI, and an indicator for a number of non-zero wideband amplitude coefficients per layer, and
the second part of the CSI report includes a precoding matrix indicator (PMI),
wherein a bitwidth of the indicator for the number of non-zero amplitude coefficients is configured for each layer based on the following equation, $\lceil \log_2 2L-1 \rceil$,
wherein L is number of beams, and
wherein L vectors are combined by a codebook.

* * * * *